United States Patent
Dabak et al.

(10) Patent No.: US 7,346,121 B2
(45) Date of Patent: Mar. 18, 2008

(54) CODE DIVISION MULTIPLE ACCESS WIRELESS SYSTEM WITH CLOSED LOOP MODE USING NINETY DEGREE PHASE ROTATION AND BEAMFORMER VERIFICATION

(75) Inventors: Anand G. Dabak, Plano, TX (US); Eko N. Onggosanusi, Madison, WI (US)

(73) Assignee: Texas Instruments Incorporated, Dallas, TX (US)

( * ) Notice: Subject to any disclaimer, the term of this patent is extended or adjusted under 35 U.S.C. 154(b) by 462 days.

(21) Appl. No.: 10/919,470

(22) Filed: Aug. 16, 2004

(65) Prior Publication Data

US 2005/0026566 A1 Feb. 3, 2005

Related U.S. Application Data

(62) Division of application No. 09/635,715, filed on Aug. 9, 2000, now Pat. No. 6,831,943.

(60) Provisional application No. 60/148,972, filed on Aug. 13, 1999.

(51) Int. Cl.
*H04L 27/00* (2006.01)
*H04B 1/00* (2006.01)

(52) U.S. Cl. ..................... 375/295; 375/146
(58) Field of Classification Search ............... 375/358, 375/316, 130, 299, 295–297, 140, 141, 146, 375/147, 267, 148; 455/101
See application file for complete search history.

(56) References Cited

U.S. PATENT DOCUMENTS

| | | | |
|---|---|---|---|
| 5,848,103 A * | 12/1998 | Weerackody | 375/295 |
| 5,920,286 A * | 7/1999 | Mohebbi | 342/383 |
| 6,067,324 A | 5/2000 | Harrison | |
| 6,192,256 B1 | 2/2001 | Whinnett | |
| 6,373,433 B1 | 4/2002 | Espax et al. | |
| 6,611,675 B1 | 8/2003 | Salonen et al. | |

FOREIGN PATENT DOCUMENTS

EP 1 191 755 A2 3/2002

OTHER PUBLICATIONS

"3rd Generation Partnership Project (3GPP); Technical Specification Group (TSG) Radio Access Network (RAN) Working Group 1 (WG1); Physical Layer Procedures(FDD)", 3GPP Ran 25.214 V1, 10.01 (Jun. 1999), TSGR1#5 (99)766, pp. 1-29, See Chapter 8.

* cited by examiner

Primary Examiner—Tesfaldet Bocure
(74) Attorney, Agent, or Firm—Ronald O. Neerings; Wade James Brady, III; Frederick J. Telecky, Jr.

(57) ABSTRACT

A wireless communication system (10). The system comprises a user station (12). The user station comprises despreading circuitry (22) for receiving and despreading a plurality of slots received from at least a first transmit antenna ($A12_1$) and a second transmit antenna ($A12_2$) at a transmitting station (14). Each of the plurality of slots comprises a first channel (DPCH) comprising a first set of pilot symbols and a second channel (PCCPCH) comprising a second set of pilot symbols. The user station further comprises circuitry (50) for measuring a first channel measurement ($\alpha_{1,n}$) for each given slot in the plurality of slots from the first transmit antenna and in response to the first set of pilot symbols in the given slot. The user station further comprises circuitry (50) for measuring a second channel measurement ($\alpha_{2,n}$) for each given slot in the plurality of slots from the second transmit antenna and in response to the first set of pilot symbols in the given slot. The user station further comprises circuitry (52) for measuring a phase difference value ($\phi_2(n)$) for each given slot in the plurality of slots in response to the first channel measurement and the second channel measurement for the given slot and in response to a ninety degree rotation of the given slot relative to a slot which was received by the despreading circuitry immediately preceding the given slot.

31 Claims, 6 Drawing Sheets

CODE DIVISION MULTIPLE ACCESS WIRELESS SYSTEM WITH CLOSED LOOP MODE USING NINETY DEGREE PHASE ROTATION AND BEAMFORMER VERIFICATION

STATEMENT REGARDING FEDERALLY SPONSORED RESEARCH OR DEVELOPMENT

This application claims the benefit, under 35 U.S.C. §120, of divisional U.S. application Ser. No. 09/635,715, filed Aug. 9, 2000, now U.S. Pat. No. 6,831,943 which claims the benefit under 35 U.S.C. §119(e)(1), of U.S. Provisional Application No. 60/148,972, filed Aug. 13, 1999, and incorporated herein by this reference.

CROSS-REFERENCES TO RELATED APPLICATIONS

Not Applicable.

BACKGROUND OF THE INVENTION

The present embodiments relate to wireless communications systems and, more particularly, to a closed-loop mode of operation for such systems.

Wireless communications have become very prevalent in business, personal, and other applications, and as a result the technology for such communications continues to advance in various areas. One such advancement includes the use of spread spectrum communications, including that of code division multiple access ("CDMA"). In such communications, a user station (e.g., a hand held cellular phone) communicates with a base station, where typically the base station corresponds to a "cell." Further, CDMA systems are characterized by simultaneous transmission of different data signals over a common channel by assigning each signal a unique code. This unique code is matched with a code of a selected user station within the cell to determine the proper recipient of a data signal. CDMA continues to advance and with such advancement there has brought forth a next generation wideband CDMA ("WCDMA"). WCDMA includes alternative methods of data transfer, one being frequency division duplex ("FDD") and another being time division duplex ("TDD").

Due to various factors including the fact that CDMA communications are along a wireless medium, an originally transmitted communication from a base station to a user station may arrive at the user station at multiple and different times. Each different arriving signal that is based on the same original communication is said to have a diversity with respect to other arriving signals originating from the same transmitted communication. Further, various diversity types may occur in CDMA communications, and the CDMA art strives to ultimately receive and identify the originally transmitted data by exploiting the effects on each signal that are caused by the one or more diversities affecting the signal.

One type of CDMA diversity occurs because a transmitted signal from a base station is reflected by objects such as the ground, mountains, buildings, and other things that it contacts. As a result, a same single transmitted communication may arrive at a receiving user station at numerous different times, and assuming that each such arrival is sufficiently separated in time, then each different arriving signal is said to travel along a different channel and arrive as a different "path." These multiple signals are referred to in the art as multiple paths or multipaths. Several multipaths may eventually arrive at the user station and the channel traveled by each may cause each path to have a different phase, amplitude, and signal-to-noise ratio ("SNR"). Accordingly, for one communication from one base station to one user station, each multipath is originally a replica of the same originally transmitted data, and each path is said to have time diversity relative to other multipath(s) due to the difference in arrival time which causes different (uncorrelated) fading/noise characteristics for each multipath. Although multipaths carry the same user data to the receiver, they may be separately recognized by the receiver based on the timing of arrival of each multipath. More particularly, CDMA communications are modulated using a spreading code which consist of a series of binary pulses, and this code runs at a higher rate than the symbol data rate and determines the actual transmission bandwidth. In the current industry, each piece or CDMA signal transmitted according to this code is said to be a "chip," where each chip corresponds to an element in the CDMA code. Thus, the chip frequency defines the rate of the CDMA code. Given the use of transmission of the CDMA signal using chips, then multipaths separated in time by more than one of these chips are distinguishable at the receiver because of the low autocorrelations of CDMA codes as known in the art.

In contrast to multipath diversity which is a natural phenomenon, other types of diversity are sometimes designed into CDMA systems in an effort to improve SNR, thereby improving other data accuracy measures (e.g., bit error rate ("BER"), frame error rate ("FER"), and symbol error rate ("SER")). An example of such a designed diversity scheme is antenna diversity and is introduced here since it pertains to the communication methodology used in the preferred embodiments discussed later. Looking first in general to antenna diversity, which is sometimes referred to as antenna array diversity, such diversity describes a wireless system using more than one antenna by a same station. Antenna diversity often proves useful because fading is independent across different antennas. Further, the notion of a station using multiple antennas is often associated with a base station using multiple antennas to receive signals transmitted from a single-antenna mobile user station, although more recently systems have been proposed for a base station using multiple antennas to transmit signals transmitted to a single-antenna mobile station. The present embodiments relate more readily to the case of a base station using multiple transmit antennas and, thus, this particular instance is further explored below.

The approach of using more than one transmit antenna at the base station is termed transmit antenna diversity. As an example in the field of mobile communications, a base station transmitter is equipped with two antennas for transmitting to a single-antenna mobile station. The use of multiple antennas at the base station for transmitting has been viewed as favorable over using multiple antennas at the mobile station because typically the mobile station is in the form of a hand-held or comparable device, and it is desirable for such a device to have lower power and processing requirements as compared to those at the base station. Thus, the reduced resources of the mobile station are less supportive of multiple antennas, whereas the relatively high-powered base station more readily lends itself to antenna diversity. In any event, transmit antenna diversity also provides a form of diversity from which SNR may be improved over single antenna communications by separately processing and combining the diverse signals for greater data accuracy at the receiver. Also in connection with transmit antenna diversity and to further contrast it with multipath diversity described above, note that the multiple transmit antennas at a single station are typically within several meters (e.g., three to four meters) of one another, and this spatial relationship is also sometimes referred to as providing spatial diversity. Given the spatial diversity distance, the same signal transmitted by each antenna will arrive at a destination (assuming no other diversity) at respective times that relate to the distance between the transmitting antennas. However, the difference between these times is considerably smaller than the width of a chip and, thus, the arriving signals are not separately distinguishable in the same manner as are multipaths described above.

Given the development of transmit antenna diversity schemes, two types of signal communication techniques have evolved to improve data recognition at the receiver given the transmit antenna diversity, namely, closed loop transmit diversity and open loop transmit diversity. Both closed loop transmit diversity and open loop transmit diversity have been implemented in various forms, but in all events the difference between the two schemes may be stated with respect to feedback. Specifically, a closed loop transmit diversity system includes a feedback communication channel while an open loop transmit diversity system does not. More particularly for the case of the closed loop transmit diversity system, a receiver receives a communication from a transmitter and then determines one or more values, or estimates, of the channel effect imposed on the received communication. The receiver then communicates (i.e., feeds back) one or more representations of the channel effect to the transmitter, so the transmitter may then modify future communication(s) in response to the channel effect. For purposes of the present document, the feedback values are referred to as beamformer coefficients in that they aid the transmitter in forming its communication "beam" to a user station.

With the advancement of CDMA and WCDMA there has been a comparable development of corresponding standards. For instance, a considerable standard that has developed, and which continues to evolve, in connection with WCDMA is the $3^{rd}$ Generation partnership Project ("3GPP") for wireless communications, and it is also reflected in 3GPP 2 systems. Under 3GPP, closed loop antenna diversity for WCDMA must be supported, and in the past 3GPP set forth a closed loop operational method that alternates between three different communication modes. The choice of a mode at a given time is dictated by the Doppler fading rate of a particular user station receiver; in other words, since user stations are likely to be mobile, then due to the mobility as well as other factors there is likely to be an amount of Doppler fading in the signals received by such a user station from a base station and this fading affects the choice of a closed loop mode. In addition to the different fading rates gibing rise to the selection of one of the three prior art modes of operation, each mode differs in certain respects. One difference is based on how the beamformer coefficients are quantized by the user station, and other differences also apply to different ones of the modes. Such differences are detailed later. In any event, note here by way of background that generally there is a tradeoff among the three modes, where greater resolution in the feedback information, and hence a greater level of beamformer control, is achieved at the expense of increased feedback and processing delay.

The preceding three modes have proven to achieve a considerable level of performance as measurable in various manners, such as BER, FER, or SNR; however, the present inventors also have identified various drawbacks with the overall three mode approach. For example, a certain level of complexity is required to implement the necessary algorithm to switch between the three different modes in response to changes in Doppler fading. As another example, an alternative approach may be implemented using one mode which provides results that match or outperform the results achieved by the prior art modes 1 and 2 across the Doppler frequencies for which those prior art modes are used. Still other benefits may be ascertainable by one skilled in the art given a further understanding of the preferred embodiments, as should be accomplished from the detailed description provided below.

BRIEF SUMMARY OF THE INVENTION

In the preferred embodiment, there is a wireless communication system. The system comprises a user station. The user station comprises despreading circuitry for receiving and despreading a plurality of slots received from at least a first transmit antenna and a second transmit antenna at a transmitting station. Each of the plurality of slots comprises a first channel comprising a first set of pilot symbols and a second channel comprising a second set of pilot symbols. The user station further comprises circuitry for measuring a first channel measurement for each given slot in the plurality of slots from the first transmit antenna and in response to the first set of pilot symbols in the given slot. The user station further comprises circuitry for measuring a second channel measurement for each given slot in the plurality of slots from the second transmit antenna and in response to the first set of pilot symbols in the given slot. The user station further comprises circuitry for measuring a phase difference value for each given slot in the plurality of slots in response to the first channel measurement and the second channel measurement for the given slot and in response to a ninety degree rotation of the given slot relative to a slot which was received by the despreading circuitry immediately preceding the given slot.

DETAILED DESCRIPTION OF THE INVENTION

Figure 1:
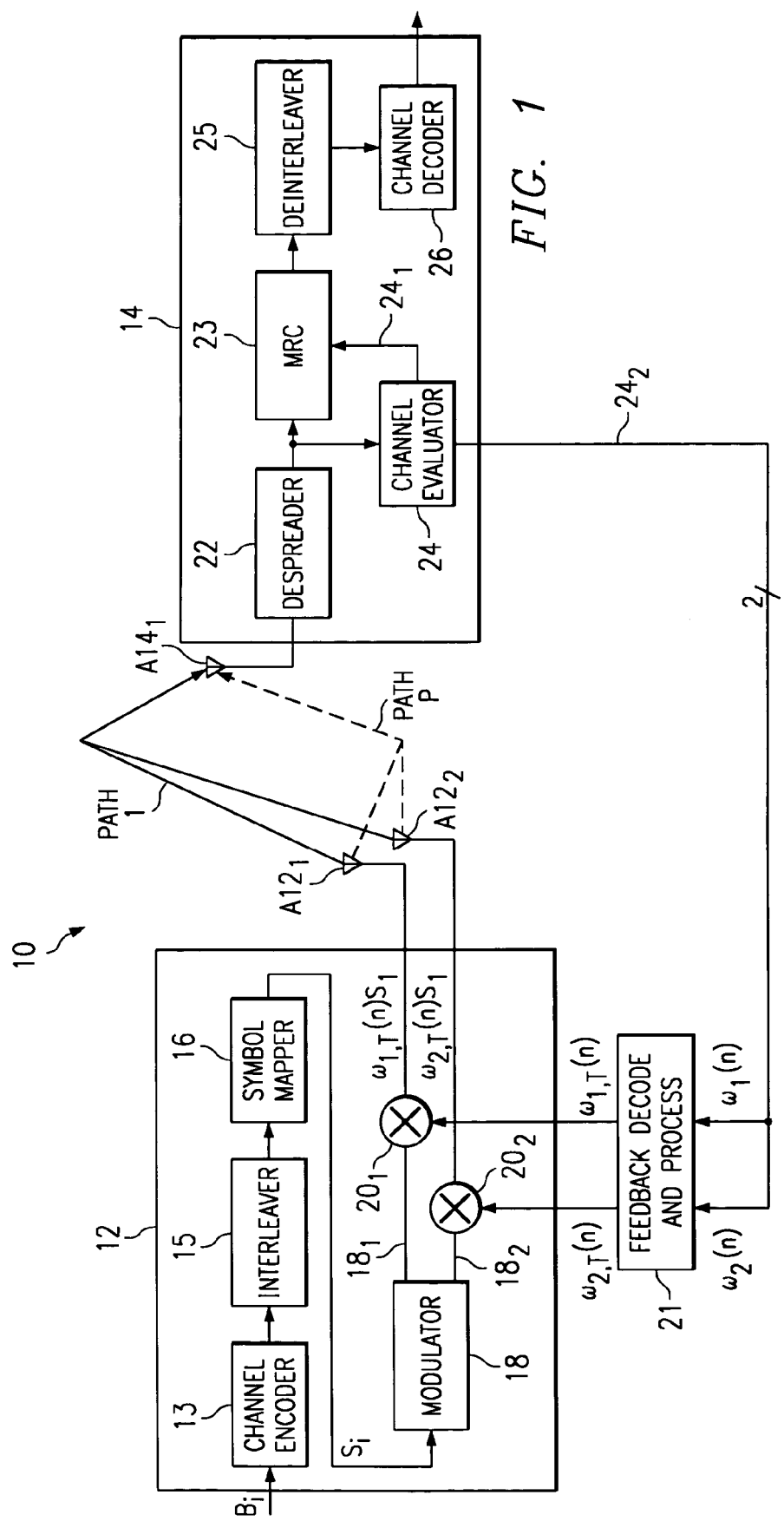
FIG. 1 illustrates a closed loop transmit antenna diversity system within which the preferred embodiments may be implemented.

FIG. 1 illustrates a closed loop transmit antenna diversity system 10 within which the preferred embodiments may be implemented, and also which in a block form may represent the prior art. Accordingly, the following discussion first examines system 10 in a general fashion as applying to both the preferred embodiments and the prior art, followed by a detailed discussion with additional illustrations of the particular modifications to system 10 to implement the preferred embodiments.

Turning to system 10 of FIG. 1, it includes a transmitter 12 and a receiver 14. By way of example, assume that transmitter 12 is a base station 12 while receiver 14 is a mobile user station 14. Also, for the sake of simplifying the discussion, each of these components is discussed separately below. Lastly, note that the dosed loop technique implemented by system 10 is sometimes referred to in the art as a transmit adaptive array ("TxAA"), while other dosed loop techniques also should be ascertainable by one skilled in the art Base station 12 receives information bits $B_i$ at an input to a channel encoder 13. Channel encoder 13 encodes the information bits $B_i$ in an effort to improve raw bit error rate. Various encoding techniques may be used by channel encoder 13 and as applied to bits $B_i$, with examples including the use of convolutional code, block code, turbo code, concatenated codes, or a combination of any of these codes. The encoded output of channel encoder 13 is coupled to the input of an interleaver 15. Interleaver 15 operates with respect to a block of encoded bits and shuffles the ordering of those bits so that the combination of this operation with the encoding by channel encoder 13 exploits the time diversity of the information. For example, one shuffling technique that may be performed by interleaver 15 is to receive bits in a matrix fashion such that bits are received into a matrix in a row-by-row fashion, and then those bits are output from the matrix to a symbol mapper 16 in a column-by-column fashion. Symbol mapper 16 then converts its input bits to symbols, designated generally as $S_i$. The converted symbols $S_i$ may take various forms, such as quadrature phase shift keying ("QPSK") symbols, binary phase shift keying ("BPSK") symbols, or quadrature amplitude modulation ("QAM") symbols. In any event, symbols $S_i$ may represent various information such as user data symbols, as well as pilot symbols and control symbols such as transmit power control ("TPC") symbols and rate information ("RI") symbols. Symbols $S_i$ are coupled to a modulator 18. Modulator 18 modulates each data symbol by combining it with, or multiplying it times, a CDMA spreading sequence which can be a pseudo-noise ("PN") digital signal or PN code or other spreading codes (i.e., it utilizes spread spectrum technology). In any event, the spreading sequence facilitates simultaneous transmission of information over a common channel by assigning each of the transmitted signals a unique code during transmission. Further, this unique code makes the simultaneously transmitted signals over the same bandwidth distinguishable at user station 14 (or other receivers). Modulator 18 has two outputs, a first output $18_1$ connected to a multiplier $20_1$ and a second output $18_2$ connected to a multiplier $20_2$. Generally, each of multipliers $20_1$ and $20_2$, for a communication slot n, receives a corresponding and per-slot decoded weight value, $\omega_{1,T}(n)$ and $\omega_{2,T}(n)$, from a feedback decode and process block 21. Feedback decode and process block 21 provides weighted values $\omega_{1,T}(n)$ and $\omega_{2,T}(n)$ in response to values $\omega_1(n)$ and $\omega_2(n)$, respectively, as further discussed below. Each of multiplier $20_1$ and $20_2$ multiplies the respective value $\omega_{1,T}(n)$ and $\omega_{2,T}(n)$ times the corresponding output $18_1$ or $18_2$ from modulator 18 and, in response, each of multipliers $20_1$ and $20_2$ provides an output to a respective transmit antenna $A12_1$ and $A12_2$, where antennas $A12_1$ and $A12_2$ are approximately three to four meters apart from one another. As detailed later, in applying the various modes of operation in the prior art, the operation of multiplier $20_1$ is based on normalized value (i.e., $\omega_{1,T}(n)$ is normalized), while the operation of multiplier $20_2$ may be based on a single slot value of $\omega_{2,T}(n)$ for certain modes of operation while it is based on an average of successively received values of $\omega_{2,T}(n)$ for another mode of operation, and in either case $\omega_{2,T}(n)$ is relative to the normalized value of $\omega_{1,T}(n)$.

Receiver 14 includes a receive antenna $A14_1$ for receiving communications from both of transmit antennas $A12_1$ and $A12_2$. Recall that such communications may pass by various multipaths, and due to the spatial relationship of transmit antennas $A12_1$ and $A12_2$, each multipath may include a communication from both transmit antenna $A12_1$ and transmit antenna $A12_2$. In the illustration of FIG. 1, a total of P multipaths are shown. Within receiver 14, signals received by antenna $A14_1$ are connected to a despreader 22. Despreader 22 operates in many respects according to known principles, such as by multiplying the CDMA signal times the CDMA code for user station 14 and resolving any multipaths, thereby producing a despread symbol stream at its output and at the symbol rate. Additional details relating to despreader 22 are also discussed later in connection with its breakdown of different channels of information as received by antenna $A14_1$. The despread signals output by despreader 22 are coupled to maximal ratio combining ("MRC") block 23, and also to a channel evaluator 24. As detailed considerably below, channel evaluator 24 performs two different channel determinations, and to avoid confusion one such determination is referred to as channel measurement while the other is referred to as channel estimation, where both determinations are based at least on the incoming despread data. Further, channel evaluator 24 provides two outputs. A first output $24_1$ from channel estimator 24 outputs a channel estimation, designated as $\hat{h}_n$, to MRC block 23. In response to receiving the channel estimation, MRC block 23 applies the estimation to the despread data symbols received from despreader 22 using a rake receiver; however, the application of the estimate to the data may be by way of alternative signal combining methods. A second output $24_2$ from channel evaluator 24 communicates the values $\omega_1(n)$ and $\omega_2(n)$, introduced earlier, back toward base station 12 via a feedback channel. As also detailed below, the values $\omega_1(n)$ and $\omega_2(n)$ are determined by channel evaluator 24 in response to a channel measurement made by channel evaluator 24. In any event, one skilled in the art should appreciate from the preceding that the values $\omega_1(n)$ and $\omega_2(n)$ are therefore the closed loop beamformer coefficients introduced above.

Returning to MRC block 23 of user station 14, once it applies the channel estimation to the despread data, its result is output to a deinterleaver 25 which operates to perform an inverse of the function of interleaver 15, and the output of deinterleaver 25 is connected to a channel decoder 26. Channel decoder 26 may include a Viterbi decoder, a turbo decoder, a block decoder (e.g., Reed-Solomon decoding), or still other appropriate decoding schemes as known in the art. In any event, channel decoder 26 further decodes the data received at its input, typically operating with respect to certain error correcting codes, and it outputs a resulting stream of decoded symbols. Indeed, note that the probability of error for data input to channel decoder 26 is far greater than that after processing and output by channel decoder 26. For example, under current standards, the probability of error in the output of channel decoder 26 may be between $10^{-3}$ and $10^{-6}$. Finally, the decoded symbol stream output by channel decoder 26 may be received and processed by additional circuitry in user station 14, although such circuitry is not shown in FIG. 1 so as to simplify the present illustration and discussion.

Having detailed system 10, attention is now returned to its identification as a closed loop system. Specifically, system 10 is named a closed loop system because, in addition to the data communication channels from base station 12 to user station 14, system 10 includes the feedback communication channel for communicating the beamformer coefficients $\omega_1(n)$ and $\omega_2(n)$ from user station 14 to base station 12; thus, the data communication and feedback communication channels create a circular and, hence, "closed" loop system. Note further that beamformer coefficients $\omega_1(n)$ and $\omega_2(n)$ may reflect various channel affecting aspects. For example, user station 14 may ascertain a level of fading in signals it receives from base station 12, such as may be caused by local interference and other causes such as the Doppler rate of user station 14 (as a mobile station), and in any event where the fading may be characterized by Rayleigh fading. As a result, user station 14 feeds back beamformer coefficients $\omega_1(n)$ and $\omega_2(n)$, and these values are processed by feedback decode and process block 21 to produce corresponding values $\omega_{1,T}(n)$ and $\omega_{2,T}(n)$, which are used by multipliers $20_1$ and $20_2$ to apply those values to various symbols to provide respective resulting transmitted signals along transmitter antenna $A12_1$ (in response to $\omega_{1,T}(n)$) and along transmitter antenna $A12_2$ (in response to $\omega_{2,T}(n)$). Thus, for a first symbol $S_1$ to be transmitted by base station 12, it is transmitted as part of a product $\omega_{1,T}(n)S_1$ along transmitter antenna $A12_1$ and also as part of a product $\omega_{2,T}(n)S_1$ along transmitter antenna $A12_2$. By way of illustration, therefore, these weighted products are also shown in FIG. 1 along their respective antennas.

Having detailed closed loop transmit antenna diversity systems, attention is now directed to the above-introduced 3GPP standard and its choice of closed loop modes at a given time in response to the Doppler fading rate of a particular user station receiver. Specifically, the following Table 1 illustrates the three different former 3GPP closed diversity modes and correlates each mode to an approximate Doppler fading rate (i.e., frequency).

TABLE 1

| Prior Art Mode | Doppler fading rate, f(Hz) |
| --- | --- |
| 1 | f > 60 |
| 2 | 10 < f < 60 |
| 3 | f < 10 |

In addition to the different fading rates giving rise to the selection of one the three prior art modes of operation in Table 1, the methodology of each mode differs in certain respects. One difference is based on how the beamformer coefficients (e.g., $\omega_1(n)$ and $\omega_2(n)$ from FIG. 1) are quantized, and other differences also apply to different ones of the modes. Such differences are further explored below.

Looking to the prior art mode 1 of operation from Table 1, it is used for relatively high Doppler fading rates, such as would be expected when the particular mobile user station 14 with which base station 12 is communicating is moving at a relatively large rate of speed. To accommodate the higher Doppler fade, mode 1 uses a reduced amount of quantization for the beamformer coefficients, that is, in mode 1 the user station feeds back a lesser amount of information to represent these coefficients. More particularly, in mode 1, a beamformer coefficient vector W is fed back by the user station, and for a two antenna base station let that coefficient vector be represented in the following Equation 1:

$$W=(\omega_1(n),\omega_2(n)) \quad \text{Equation 1}$$

In Equation 1, the coefficient $\omega_1(n)$ is intended to apply to base station transmit antenna $A12_1$ while the coefficient $\omega_2(n)$ is intended to apply to base station transmit antenna $A12_2$. In practice and to further reduce the amount of feedback information, $\omega_1(n)$ is normalized to a fixed value and, thus, it is not necessary to feed it back so long as the normalized value is known by base station 12. Accordingly, when $\omega_1(n)$ is normalized, only the value of $\omega_2(n)$ may change and is relative to the fixed value of $\omega_1(n)$ and, therefore, $\omega_2(n)$ is fed back from user station 14 to base station 12. Further, in the prior art mode 1, $\omega_2(n)$ is only allowed to be one of two values. The quantizations offered by the vector W therefore may be represented by the following Equations 2 and 3:

$$W=(1, 0) \quad \text{Equation 2}$$

$$W=(1, 1) \quad \text{Equation 3}$$

Thus, mode 1 only requires the feedback of one of two values (i.e., for $\omega_2(n)$). Further, note that the conventions in Equations 2 and 3 depict binary values, while one skilled in the art should appreciate that for the case of a binary 0, an actual value of −1 is provided on the physical feedback channel, while for the case of a binary 1, an actual value of +1 is provided on the physical feedback channel. Finally, the prior art manner for selecting the value of $\omega_2(n)$, that is, between binary 0 and 1, is discussed below.

Figure 2:
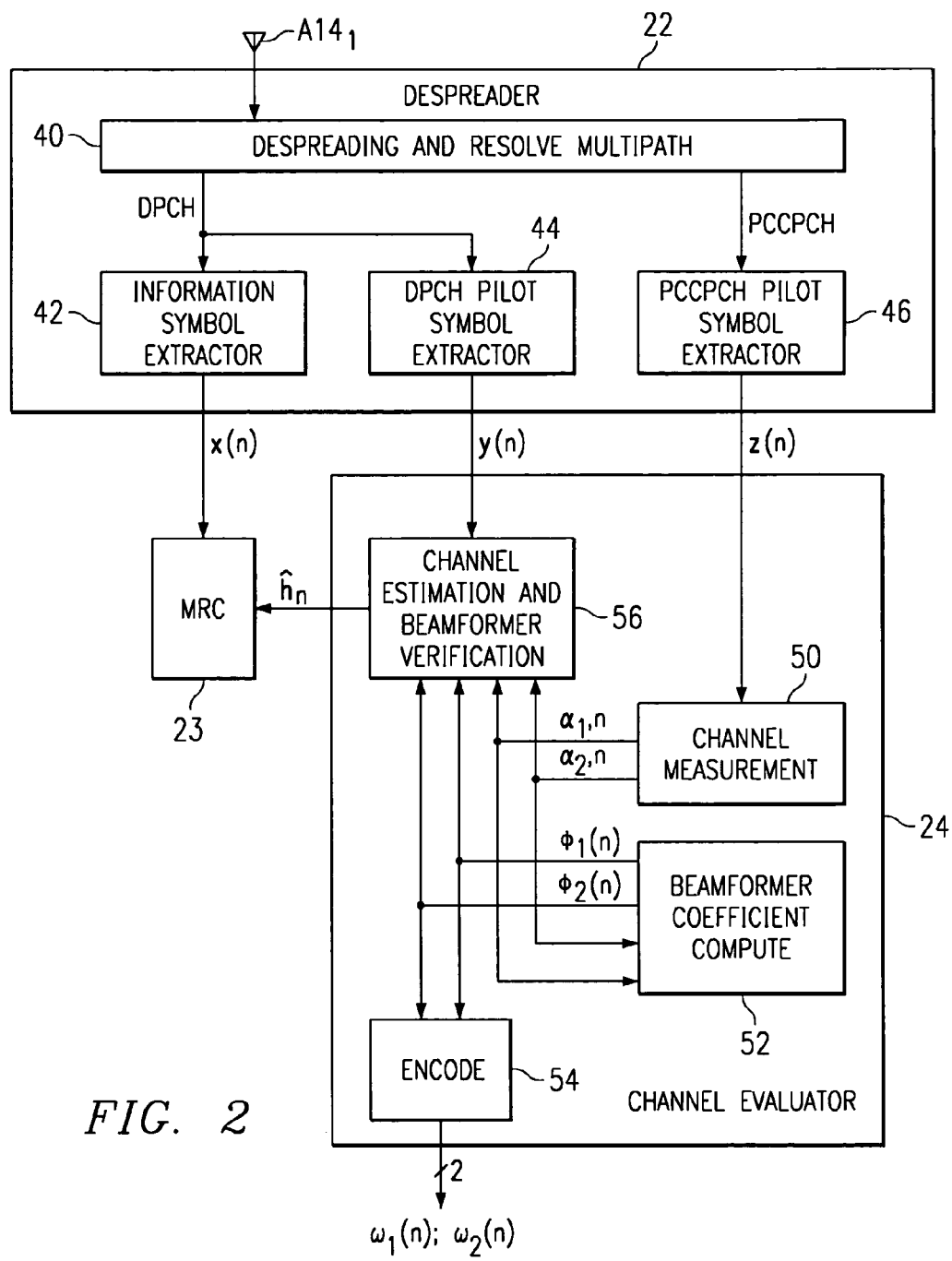
FIG. 2 illustrates an expanded view of selected blocks of user station 14 from FIG. 1.

The prior art mode 1 determination of $\omega_2(n)$ is better appreciated from the expanded illustration of FIG. 2, where certain blocks of user station 14 from FIG. 1 are further detailed. Looking to FIG. 2, it again illustrates antenna $A14_1$ providing signals to despreader 22. Despreader 22 is expanded in FIG. 2 to illustrate that it includes a despreading and resolve multipath block 40. Block 40 despreads the incoming signals from two different channels, that is, recall it was earlier introduced that despreader 22 operates with respect to different channels of information as received by antenna $A14_1$; these different channels are now illustrated in FIG. 2 as a primary common control physical channel ("PCCPCH") and a dedicated physical channel ("DPCH"). According to the prior art, the PCCPCH is transmitted by base station 12 as the same channel to all user stations (i.e., user station 14 and others communicating with base station 12), and it is not weighted in response to $\omega_1(n)$ and $\omega_2(n)$. The DPCH, however, is user station specific and it is weighted in response to $\omega_1(n)$ and $\omega_2(n)$. Both the PCCPCH and DPCH communicate in frame formats, where each frame includes a number of slots; for example, in WCDMA, each frame consists of 16 slots. Further with respect to PCCPCH and DPCH, each slot of those channels commences with some pilot symbols and also includes information symbols. Given the preceding, block 40 operates with respect to each received slot and outputs both a DPCH symbol stream and PCCPCH symbol stream, and the further processing of those streams is discussed below.

The DPCH symbol stream from block 40 is coupled to both an information symbol extractor 42 and a pilot symbol extractor 44. Each of blocks 42 and 44 operates as suggested by their names, that is, to extract from the DPCH symbol stream the DPCH information symbols and the DPCH pilot symbols, respectively. For sake of reference in this document, the DPCH information symbols are represented by x(n) while the DPCH pilot symbols are represented by y(n), where bold face is used as a convention for these and other values in this document to indicate that the value is a vector. The DPCH information symbols x(n) are output from extractor 42 to MRC block 23, while the DPCH pilot symbols y(n) are output from extractor 44 to channel evaluator 24, as further detailed later.

Returning to despreading and resolve multipath block 40 and its output of the PCCPCH symbol stream, that stream is coupled to a PCCPCH pilot symbol extractor 46. PCCPCH pilot symbol extractor 46 extracts the PCCPCH pilot symbols from the PCCPCH symbol stream. For sake of reference in this document, the PCCPCH pilot symbols are represented by z(n). The PCCPCH pilot symbols z(n) are output from extractor 46 to channel evaluator 24, as further detailed below.

Looking to channel evaluator 24 in FIG. 2, it includes a channel measurement block 50 which receives the PCCPCH pilot symbols z(n) from extractor 46. Recalling that it was earlier stated that channel evaluator 24 performs both a channel measurement and channel estimation based at least on the incoming despread data, it is now noted more particularly that block 50 performs the channel measurement aspect. Specifically, the PCCPCH pilot symbols are, according to the art, different for each different transmit antenna for a base station; thus, in the present example, the extracted PCCPCH pilot symbols z(n) includes one set of pilot symbols corresponding to base station antenna $A12_1$ and another set of pilot symbols corresponding to base station antenna $A12_2$. Since the values of the pilot symbols as transmitted by base station 12 are by definition a known value to user station 14, then based on the difference between the actually received pilot symbols and the known transmitted pilot symbols, block 50 determines, for each transmit antenna, a channel measurement reflecting any change in the actually-received pilot symbols. For sake of reference in this document, the channel measurement corresponding to antenna $A12_1$ is indicated as $\alpha_{1,n}$ and the channel measurement corresponding to antenna $A12_2$ is indicated as $\alpha_{2,n}$. Both $\alpha_{1,n}$ and $\alpha_{2,n}$ are output by channel measurement block 50 to a beamformer coefficient computation block 52.

Figure 3:
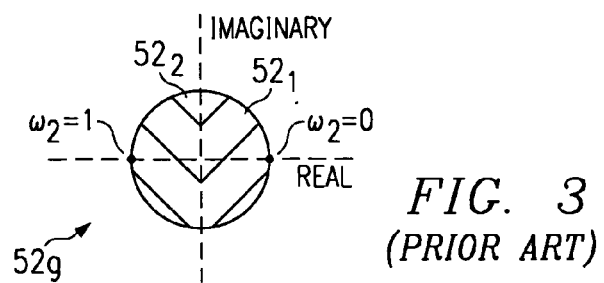
FIG. 3 illustrates a graph to depict the prior art mode 1 mapping of a channel measurement to one of two different phase shift values.

Beamformer coefficient computation block 52 computes phase difference values, denoted $\phi_1(n)$ and $\phi_2(n)$, in response to the values $\alpha_{1,n}$ and $\alpha_{2,n}$, where the values $\phi_1(n)$ and $\phi_2(n)$ as described below are the angular phase differences which are encoded into binary form to create the respective values of $\omega_1(n)$ and $\omega_2(n)$ (or just $\omega_2(n)$ where $\omega_1(n)$ is a normalized value). Recall now that under mode 1 of the prior art, the value of $\omega_2(n)$ may be only one of two states. Thus, block 52 maps the value of $\alpha_{2,n}$ to one of these two states, and this mapping function is illustrated pictorially in FIG. 3 by a graph 52g plotted along an imaginary and real axis. More particularly, graph 52g illustrates two shaded areas $52_1$ and $52_2$ corresponding to the two possible values of $\omega_2(n)$, and those two values map to two corresponding values of $\phi_2(n)$. Specifically, if the channel measurement $\alpha_{2,n}{}^H\alpha_{1,n}$ falls within area $52_1$, then the value of $\phi_2(n)$ is 0 degrees; further, this 0 degree value of $\phi_2(n)$ is output to a beamformer coefficient binary encode block 54 which converts the angular value $\phi_2(n)$ of 0 degrees into a corresponding binary value $\omega_2(n)=0$, and the value of $\omega_2(n)=0$ is fed back to base station 12. On the other hand, if the channel measurement $\alpha_{2,n}{}^H\alpha_{1,n}$ falls within area $52_2$, then the value of $\phi_2(n)$ is $\pi$ radians; further, this $\pi$ radian value of $\phi_2(n)$ is output to beamformer coefficient binary encode block 54 which converts the angular value $\phi_2(n)$ of $\pi$ radians into a corresponding binary value $\omega_2(n)=1$, and the value of $\omega_2(n)=1$ is fed back to base station 12.

Attention is now directed to an additional aspect of the prior art mode 1. Specifically, note that while user station 14 transmits a value of $\omega_2(n)$ to base station 12, there quite clearly can be effects imposed on that transmission as well, that is, there is a channel effect in the feedback signal from user station 14 to base station 12. Accordingly, from the perspective of base station 12, let $\tilde{\omega}_2(n)$ represent the signal actually received by base station 12 and corresponding to the feedback transmission of $\omega_2(n)$ from user station 14. Next, feedback decode and process block 21 decodes and processes $\tilde{\omega}_2(n)$ and in response outputs a corresponding value of $\omega_{2,T}(n)$ which is multiplied by multiplier $18_2$. As a result, while ideally base station 12 uses the correct value $\omega_2(n)$ upon which to determine $\omega_{2,T}(n)$ and to create a resulting product signal (i.e., $\omega_{2,T}(n)S_i$)), the feedback channel effect may cause base station 12 to use a different value of $\omega_2(n)$. For example, user station 14 may transmit a value of $\omega_2(n)=0$ to base station 12, but due to the feedback channel the received value may be $\tilde{\omega}_2(n)=1$. Conversely, user station 14 may transmit a value of $\omega_2(n)=1$ to base station 12, but due to the feedback channel the received value may be $\tilde{\omega}_2(n)=0$. In view of these possibilities, user station 14, when operating under the prior art mode 1, further implements a process referred to in the art as beamformer verification or antenna verification, as further detailed below.

Beamformer verification is further introduced by return to the expanded block diagram in FIG. 2. Specifically, recall it is stated above that the DPCH pilot symbols y(n) are output from extractor 44 to channel evaluator 24, and recall also that the DPCH pilot symbols have been modified by base station 12 in response to $\omega_{1,T}(n)$ and $\omega_{2,T}(n)$. Further, and as now discussed and as shown in FIG. 2, the DPCH pilot symbols y(n) are connected to a channel estimation and beamformer verification block 56. Block 56 also receives as inputs the channel measurement values $\alpha_{1,n}$ and $\alpha_{2,n}$ from channel measurement block 50 and the phase difference values $\phi_1(n)$ and $\phi_2(n)$ from beamformer coefficient computation block 52. In response to its inputs, block 56 outputs the channel estimation, introduced earlier as $\hbar_n$, to MRC block 23, but in doing so the beamformer verification process attempts to ensure that $\hbar_n$ is correctly estimated in view of previously fed back beamformer coefficients. Specifically, note that $\hbar_n$ may be defined according to the following Equation 4:

$$\hbar_n = \alpha_{1,n}\omega_{1,T}(n) + \alpha_{2,n}\omega_{2,T}(n) \qquad \text{Equation 4}$$

Thus, Equation 4 indicates mathematically that the overall change (i.e., the channel estimation, $\hbar_n$) in a signal received by user station 14 should be reflected by both the channel measurement factors $\alpha_{1,n}$ and $\alpha_{2,n}$ as well as the weight factors $\omega_{1,T}(n)$ and $\omega_{2,T}(n)$ that were multiplied by base station 12 against the signal before it was transmitted by base station 12 to user station 14. Thus, beamformer verification is a process by which user station 14 attempts to ascertain $\omega_{1,T}(n)$ and $\omega_{2,T}(n)$ as used by base station 12, and those values may then be used to determine $\tilde{h}_n$.

Equation 4 also demonstrates that, in one approach, the channel estimation, $\tilde{h}_n$, could be a direct calculation because block 56 receives the channel measurement values $\alpha_{1,n}$ and $\alpha_{2,n}$ and if it is assumed that $\omega_{1,T}(n)$ and $\omega_{2,T}(n)$ could be identified from the phase difference values $\phi_1(n)$ and $\phi_2(n)$ from beamformer coefficient computation block 52. However, because base station 12 responds to $\tilde{\omega}_2(n)$ rather than $\omega_2(n)$, then beamformer verification is a process by which user station 14 attempts to predict what value of $\tilde{\omega}_2(n)$ was received by base station 12 and that predicted value may then be used to identify the counterpart $\omega_{2,T}(n)$ in Equation 4 to determine $\tilde{h}_n$. To further appreciate this concept, beamformer verification also may be understood in connection with an example. Thus, suppose for a slot n=1, user station 14 transmits a feedback value of $\omega_2(1)$ to base station 12; in response, base station 12 receives a value, $\tilde{\omega}_2(1)$, block 21 produces a corresponding value $\omega_{2,T}(1)$, and a product $\omega_{2,T}(1)S_i$ is formed and transmitted next to user station 14. Under beamformer verification as used in the prior art mode 1, user station 14 receives the signal $\omega_{2,T}(1)S_i$, and from that signal it attempts to determine what value of $\omega_{2,T}(1)$ was actually used by base station 12 in its corresponding transmission, and this attempt is achieved by block 56 using a methodology referred to as hypothesis testing. This determined value, rather than the actual value $\omega_2(1)$ which was fed back by user station 14, is then used by block 56 to determine $\tilde{h}_n$, and that value of $\tilde{h}_n$ is used by MRC block 23 for further signal processing.

Concluding the discussion of the prior art mode 1, note that its use of only two possible data values for $\omega_2(n)$, in combination with the operations relating to hypothesis testing, have yielded a workable error rate at a reasonable level of performance speed. Indeed, relative to prior art modes 2 and 3 described below, the feedback delay of prior art mode 1 is relatively small, and a certain level of performance is achieved given this reduced delay. However, the resulting resolution obtained in response to the 2-state level of quantization of mode 1 is relatively low as compared to prior art modes 2 and 3 as further discussed below.

Looking to the prior art mode 2 of operation from Table 1, it is used for relatively mid-level Doppler fading rates, such as would be expected when a particular mobile user station 14 with which base station 12 is communicating is moving at a lesser rate of speed than for the case of a mode 1 communication. Mode 2 again uses the convention of Equation 1 and normalizes $\omega_1(n)$ (and thereby its counterpart $\phi_1(n)$), but added resolution is obtained in the computation of $\phi_2(n)$ and $\omega_2(n)$ by beamformer coefficient computation block 52. Specifically, block 52 in mode 2 applies a 45 degree constellation rotation per slot to the 2-value beamformer coefficient, that is, for each successive slot, $\phi_2(n)$ and $\omega_2(n)$ are determined based on a 45 degree rotation relative to the preceding slot; particularly, since a total of four such rotations corresponds to 180 degrees, then under the 45 degree constellation rotation the slots are generally analyzed by user station 14 by adding a 45 degree rotation to each successive slot in each succession of four slots. This rotation is achieved at user station 14 by determining the value of $\phi_2(n)$ and $\omega_2(n)$ in part based on the time slot in which the slot at issue leas received and then choosing the value of $\omega_2(n)$ with respect to the rotation to be applied to the given slot for a group i of four slots. This rotation is explored immediately below in connection with the following Table 2 and is also depicted pictorially in FIG. 4.

TABLE 2

| $w_2(n)$ | slot 4i | slot 4i + 1 | slot 4i + 2 | slot 4i + 3 |
|---|---|---|---|---|
| 0 | 0 | $\pi/4$ | $\pi/2$ | $3\pi/4$ |
| 1 | $\pi$ | $-3\pi/4$ | $-\pi/2$ | $-\pi/4$ |

Figure 4:
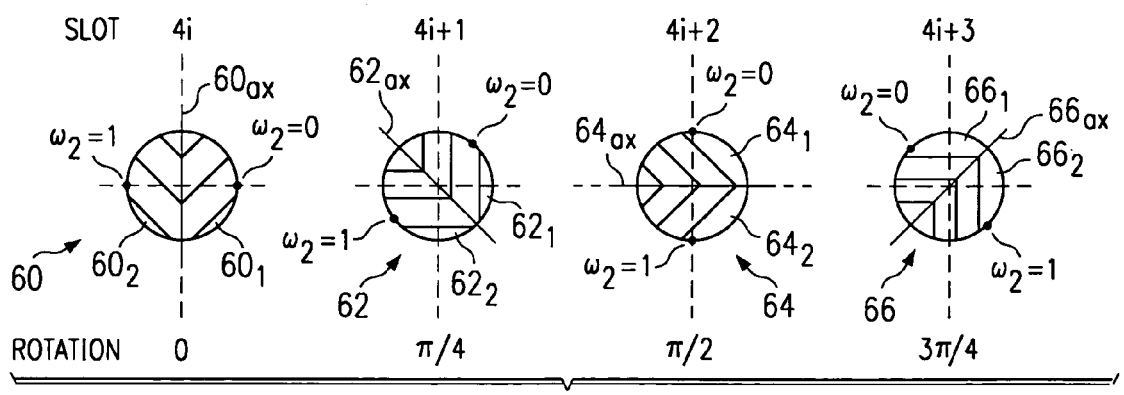
FIG. 4 illustrates four graphs to depict the prior art mode 2 mapping of channel measurements according to respective 45 degree rotations, where for each rotation the channel measurement is mapped to one of two different phase shift values.

Looking to Table 2 and FIG. 4, for a first slot 4i in a group i of four slots, the values of $\phi_2(n)$ and $\omega_2(n)$, as determined by beamformer coefficient computation block 52 in user station 14, are based on a rotation of zero degrees, as shown in graph 60 and as represented by its axis $60_{ax}$ which is not rotated relative to the vertical imaginary axis. More particularly, graph 60 illustrates two shaded areas $60_1$ and $60_2$, where if the channel measurement $\alpha_{2,n}{}^H\alpha_{1,n}$ from channel measurement block 50 falls within area $60_1$, then block 52 computes the value of $\phi_2(\mathbf{4}i)$ to be 0 degrees and this value is encoded to a corresponding binary form $\omega_2(\mathbf{4}i)=0$ by encode block 54 and is fed back to base station 12; conversely, if the channel measurement $\alpha_{2,n}{}^H\alpha_{1,n}$ falls within area $60_2$, then block 52 computes the value of $\phi_2(\mathbf{4}i)$ to be $\pi$ radians and this value is encoded to a corresponding binary form $\omega_2(\mathbf{4}i)=1$ by block 54 and is fed back to base station 12. Further, Table 2 as well as the location of points on graph 60 illustrate the phase rotation that is implemented by base station 12 in response to the values of $\tilde{\omega}_2(\mathbf{4}i)$. Specifically, if base station 12 receives a value of $\tilde{\omega}_2(\mathbf{4}i)$ equal to 0, then feedback decode and process block of base station 12 treats the channel measurement phase change for slot 4i as 0 degrees; however, if base station 12 receives a value of $\tilde{\omega}_2(\mathbf{4}i)$ equal to 1, then base station 12 treats the channel measurement phase change for slot 4i as equal to $\pi$ radians.

Table 2 and FIG. 4 also illustrate the remaining three slots in group i, where comparable reference numbers are used in FIG. 4 such that graph 62 corresponds to slot 4i+1 and represents a rotation equal to $\pi/4$ radians, graph 64 corresponds to slot 4i+2 and represents a rotation equal to $\pi/2$ radians, and graph 66 corresponds to slot 4i+3 and represents a rotation equal to $3\pi/4$ radians. Thus, looking to graph 62 as another example, its axis $62_{ax}$ depicts the rotation of $\pi/4$ radians relative to the vertical imaginary axis as used for slot 4i+1. Further, graph 62 illustrates two shaded areas $62_1$ and $62_2$, where if the channel measurement $\alpha_{2,n}{}^H\alpha_{1,n}$ determined by block 50 of user station 14 falls within area $62_1$, then the value of $\phi_2(\mathbf{4}i+1)$ is $\pi/4$ radians and a corresponding binary value for $\omega_2(\mathbf{4}i+1)$ equal to 0 is produced and fed back to base station 12, whereas if the channel measurement $\alpha_{2,n}{}^H\alpha_{1,n}$ falls within area $62_2$, then the value of $\phi_2(\mathbf{4}i+1)$ is $-3\pi/4$ radians and a corresponding binary value for $\omega_2(\mathbf{4}i+1)$ equal to 1 is produced and fed back to base station 12. Further, Table 2 as well as the location of points on graph 62 illustrate the phase rotation that is implemented by base station 12 in response to the values of $\tilde{\omega}_2(\mathbf{4}i+1)$. Specifically for slot 4i+1, if base station 12 receives a value of $\tilde{\omega}_2(\mathbf{4}i+1)$ equal to 0, then feedback decode and process block of base station 12 treats the channel estimation phase change for slot 4i+1 as $\pi/4$ radians; however, if base station 12 receives a value of $\tilde{\omega}_2(\mathbf{4}i+1)$ equal to 1, then base station 12 treats the channel estimation phase change for slot 4i+1 as equal to $-3\pi/4$ radians. Given this second example as well as the preceding example described above, one skilled in the art should readily appreciate the remaining values and illustrations in Table 2 and FIG. 4 as applied to the value of $\phi_2(n)$ by user station 14 and the conversion of that value to $\omega_2(n)$ as well as the interpretation of the value of $\tilde{\omega}_2(n)$ by feedback decode and process block of base station 12 according to mode 2 in the prior art.

Attention is now directed to an additional aspect of the prior art mode 2 processing in response to $\omega_2(n)$ transmitted by user station 14. First, recalling the convention introduced above with respect to mode 1, from the perspective of base station 12, $\tilde{\omega}_2(n)$ represents the signal actually received by base station 12 and corresponding to the feedback transmission of $\omega_2(n)$ from user station 14. Second, note now that feedback decode and process block 21 during the prior art mode 2 actually uses an averaging filter to determine the value of $\omega_{2,T}(n)$ for each received value of $\tilde{\omega}_2(n)$. Specifically, block 21 calculates an average over four values of $\omega_2$ (or $\tilde{\omega}_2$, from the perspective of base station 12), so that the result is $\omega_{2,T}(n)$ and is defined by the following Equation 5:

$$w_{2,T}(n) = \frac{\tilde{w}_2(4i) + \tilde{w}_2(4i-1) + \tilde{w}_2(4i-2) + \tilde{w}_2(4i-3)}{4}$$

Equation 5

The indication of $\tilde{\omega}_2(4i)$ in Equation 5 is to depict the most recent beamformer coefficient received by base station 12 via the feedback channel, and thus the remaining three addends in Equation 5 are based on the three other beamformer coefficients preceding that most recent coefficient. These four values are averaged (i.e., divided by 4), and in the prior art mode 2 of operation, base station 12 multiplies the result, $\omega_{2,T}(n)$, times the signal from second output $18_2$ connected to multiplier $20_2$. $\omega_{1,T}(n)$, however, is simply the counterpart to the normalized value $\omega_1(n)$, and base station 12 multiplies it times the signal from first output $18_1$, connected to multiplier $20_1$.

Given the preceding, one skilled in the art will appreciate that the prior art mode 2 also implements the feedback of one of two values (i.e., for $\omega_2(n)$). However, given the additional use of phase rotation, greater beamformer resolution is achieved relative to prior art mode 1. In other words, while $\omega_2(n)$ for any given slot may only take one of two values as in the case of the prior art mode 1, the use of 45 degree rotation over four slots creates an effective constellation of eight possible values (i.e., 2 values/slot*4 slots/rotation cycle=8 values). However, note that the prior art mode 2 does not use any type of beamformer verification which is used by prior art mode 1; indeed, the present inventors have observed that beamformer verification may not be feasible for the prior art mode 2 because it could add, in combination with the four-cycle 45 degree rotation, an unworkable amount of complexity. Further, with phase rotation and averaging, the better resolution of the prior art mode 2 is offset in part by an increased overall delay relative to prior art mode 1.

Looking to the prior art mode 3 of operation from Table 1, it is appreciated as used for Doppler fading rates that are relatively low as compared to prior art modes 1 and 2, where the mode 3 fading rates would be expected when mobile user station 14 is moving at a relatively low rate of speed. Given the lower speed of user station 14, additional time is available for additional levels of processing, as is implemented in the prior art mode 3. Specifically, mode 3 increases its quantization for the beamformer coefficients, but the increase is not achieved based on rotation as shown in FIG. 2 for the prior art mode 2. Instead, the prior art mode 3 feeds back a total of four bits of information, where one bit is intended as an amplitude correction bit while the remaining three bits are to correct for phase shifts.

Having discussed closed loop transmit antenna diversity system 10 as it may implement the prior art, the attention is now directed to an implementation of the preferred embodiment into system 10. By way of overview to the preferred embodiment, it contemplates various alternative aspects versus those discussed above. First, in the preferred embodiment, prior art modes 1 and 2 are eliminated and replaced by a single mode of operation; because this single mode of operation spans the entire Doppler fading range of prior art modes 1 and 2, it is hereafter referred to as the broad range closed loop mode. Thus, the broad range closed loop mode may be combined with the prior art mode 3 of operation to accommodate the entire anticipated range of Doppler frequencies for closed loop communications. Second, with respect to the broad range closed loop mode, in addition to providing one mode in place of two prior art modes, it includes additional aspects that distinguish it further from the prior art. One such aspect is the use of a two phase rotation for determining beamformer coefficients. Another aspect is the use of beamformer verification, implemented using one of two different alternatives, in the same mode that implements phase rotation for determining beamformer coefficients. Each of these points should be further appreciated by one skilled in the art given the remaining teachings of this document.

The use of a two phase rotation for determining beamformer coefficients according to the broad range closed loop mode is now described. The broad range closed loop mode uses the earlier convention from Equation 1 and normalizes the value $\omega_1(n)$ as detailed later, and also thereby normalizes its phase difference counterpart, $\phi_1(n)$; however, in the preferred embodiment an overall resolution differing from the prior art modes 1 and 2 is obtained in the computation of $\phi_2(n)$ and $\omega_2(n)$ by beamformer coefficient computation block 52. Specifically, block 52 in the broad range closed loop mode applies a 90 degree constellation rotation per slot to the 2-value beamformer coefficient. Accordingly, for each successive slot n, n+1, n+2, and so forth, $\phi_2(n)$ and $\omega_2(n)$ are determined based on a 90 degree rotation relative to the preceding slot. Since a total of two such rotations correspond to 180 degrees, then under the 90 degree constellation rotation the slots are generally analyzed by user station 14 by adding a 90 degree rotation to each successive slot. This rotation is achieved at user station 14 by determining the value of $\phi_2(n)$ in part based on the time slot in which the slot at issue was received and then choosing the value of $\phi_2(n)$ with respect to the rotation to be applied to the given slot for a group i of two slots. This rotation is explored immediately below in connection with the following Table 3 and is also depicted pictorially in FIG. 5, and recall also that these operations may be implemented within system 10 shown in FIG. 1 to thereby create the preferred embodiment.

TABLE 3

| $w_2(n)$ | slot $2i$ | slot $2i + 1$ |
|---|---|---|
| 0 | 0 | $\pi/2$ |
| 1 | $\pi$ | $-\pi/2$ |

Figure 5:
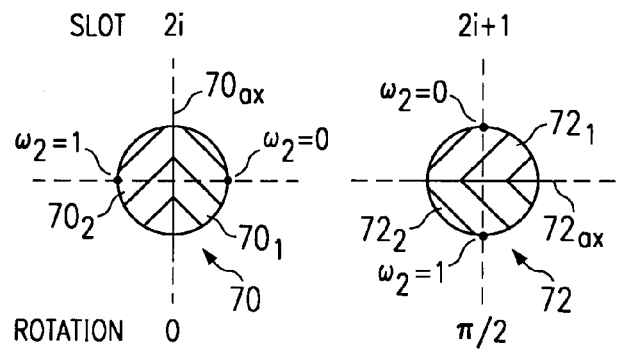
FIG. 5 illustrates two graphs to depict the mapping of channel measurements according to the preferred embodiment broad range closed loop mode according to respective 90 degree rotations, where for each rotation the channel measurement is mapped to one of two different phase shift values.

Looking to Table 3 and FIG. 5, for a first slot $2i$ in a group i of two slots, the value of $\phi_2(2i)$, as determined by beamformer coefficient computation block 52 in user station 14, is based on a rotation of zero degrees as shown in graph 70 and as represented by its axis 70$_{ax}$ which is not rotated relative to the vertical imaginary axis. More particularly, graph 70 illustrates two shaded areas 70$_1$ and 70$_2$, where if the channel measurement $\alpha_{2,n}{}^H\alpha_{1,n}$ from block 50 falls within area 70$_1$, then block 52 computes the value of $\phi_2(2i)$ to be 0 degrees and this value is encoded by encode block 54 to produce a binary counterpart of $\omega_2(2i)=0$ which is fed back to base station 12; conversely, if the channel measurement $\alpha_{2,n}{}^H\alpha_{1,n}$ falls within area 70$_2$, then block 52 computes the value of $\phi_2(2i)$ to be $\pi$ radians and this value is encoded by block 54 to produce a binary counterpart of $\omega_2(2i)=1$ which is fed back to base station 12. Further, Table 3 as well as the location of points on graph 70 illustrate the phase rotation that is implemented by base station 12 in response to the possible values of $\tilde{\omega}_2(2i)$. Specifically, if base station 12 receives a value of $\tilde{\omega}_2(2i)=0$, then feedback decode and process block of base station 12 treats the channel measurement phase change for slot $2i$ as 0 degrees; however, if base station 12 receives a value of $\tilde{\omega}_2(2i)=1$, then base station 12 treats the channel measurement phase change for slot $2i$ as equal to $\pi$ radians.

Table 3 and FIG. 5 also illustrate that for a second slot, $2i+1$, in the group i of two slots, the value of $\phi_2(2i+1)$, as determined by beamformer coefficient computation block 52 in user station 14, is based on a 90 degree rotation as shown in graph 72 and as represented by its axis 72$_{ax}$ which is rotated 90 degrees relative to the vertical imaginary axis. Graph 72 illustrates two shaded areas 72$_1$ and 72$_2$, where if the channel measurement $\alpha_{2,n}{}^H\alpha_{1,n}$ from block 50 falls within area 72$_1$, then block 52 computes the value of $\phi_2(2i+1)$ to be $\pi/2$ radians and this value is encoded by encode block 54 into a binary counterpart $\omega_2(2i+1)$ equal to 0 which is fed back to base station 12; conversely, if the channel measurement $\alpha_{2,n}{}^H\alpha_{1,n}$ falls within area 72$_2$, then block 52 computes the value of $\phi_2(2i+1)$ to be $\pi/2$ radians and this value is encoded by block 54 into a binary counterpart $\omega_2(2i+1)$ equal to 1 which is fed back to base station 12. Further, Table 3 as well as the location of points on graph 72 illustrate the phase rotation that is implemented by base station 12 in response to the values of $\tilde{\omega}_2(2i+1)$. Specifically, if base station 12 receives a value of $\tilde{\omega}_2(2i+1)$ equal to 0, then feedback decode and process block of base station 12 treats the channel measurement phase change for slot $2i+1$ as $\pi/2$ radians; however, if base station 12 receives a value of $\tilde{\omega}_2(2i+1)$ equal to 1, then base station 12 treats the channel measurement phase change for slot $2i$ as equal to $-\pi/2$ radians.

The preceding operations of the broad range closed loop mode to determine the value of $\omega_2(n)$ also may be represented mathematically by relating to the actual phase difference value $\phi(n)$ from Table 3 (i.e., one of the values 0, $\pi$, $\pi/2$, or $-\pi/2$). In this case, then in the preferred embodiment and for a slot n, $\phi(n)$ is chosen to maximize the instantaneous power, P(n), defined according to the following Equation 6:

$$P(n)^{def} = \|\alpha_{1,n}\omega_1(n) + \alpha_{2,n}\omega_2(n)\|^2 = \qquad \text{Equation 6}$$
$$\frac{1}{2}(\|\alpha_{1,n}\|^2 + \|\alpha_{2,n}\|^2 + 2\times\text{real}\{\alpha_{1,n}^H\alpha_{2,n}e^{j\phi_2(n)}\})$$

Equation 6 implements various conventions which are now defined for clarity. First, real$\{x\}$ denotes the real portion of a complex number x. Second, the superscript of "H" denotes the conjugate of a matrix or vector transpose. Finally, $\|v\|$ denotes the Euclidean norm of vector v.

Figure 6:
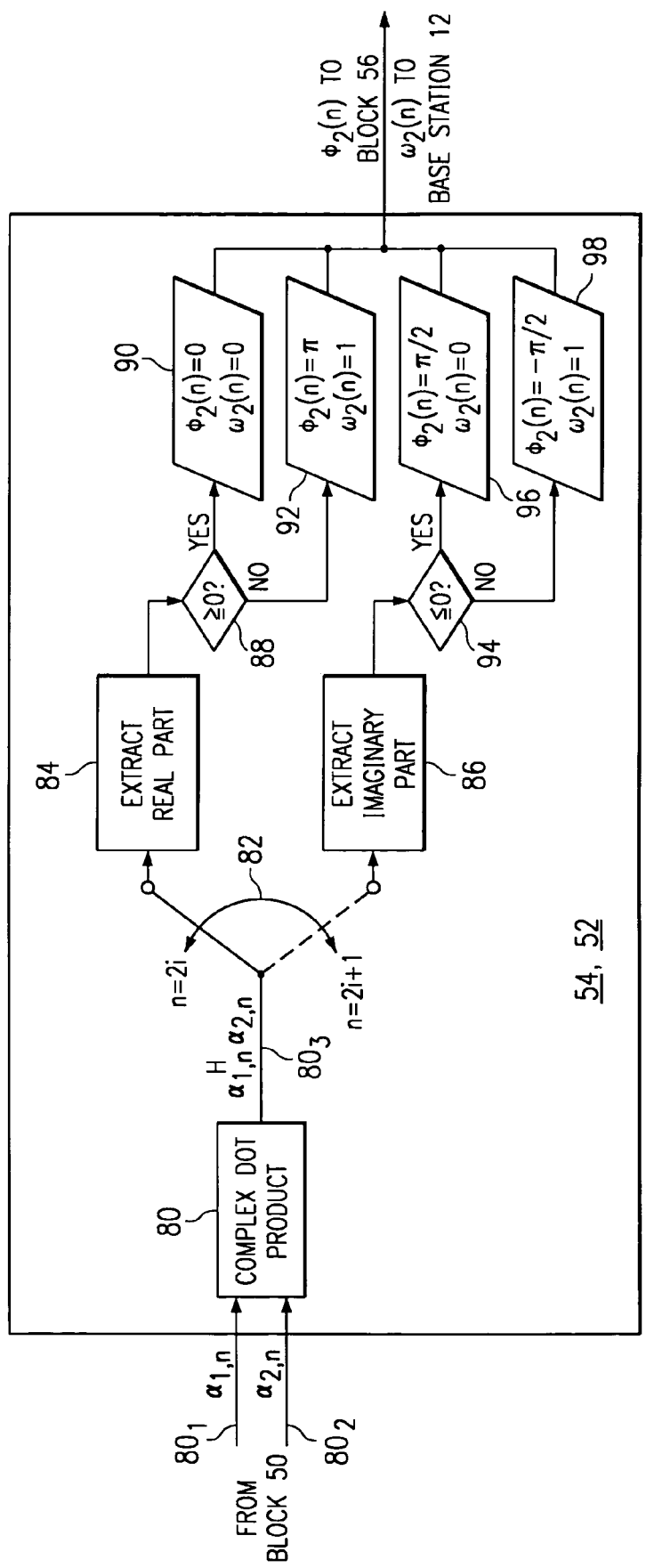
FIG. 6 illustrates a block diagram of the functional operation of beamformer coefficient computation block 52 and beamformer coefficient binary encode block 54 from FIG. 2 and according to the preferred embodiment.

Further in the preferred embodiment, and as may be seen from Equation 6, the maximum of the instantaneous power, P(n), occurs where $\phi_2(n)$ is at such a value so as to maximize the term from Equation 6 of real$\{\alpha_{1,n}{}^H\alpha_{2,n}e^{j\phi_2(n)}\}$ with $\phi(n)\in\{0,\pi\}$ when n is even, and $\phi(n)\in\{\pm\pi/2\}$ when n is odd. Thus, under the preferred embodiment, the value of $\phi_2(n)$ may be selected to be of two values, for either n being odd or even, by reference only to the term real$\{\alpha_{1,n}{}^H\alpha_{2,n}e^{j\phi_2(n)}\}$, as is achieved by the block diagram in FIG. 6. Specifically, FIG. 6 illustrates a block diagram which achieves this result and that combines beamformer coefficient computation block 52 and beamformer coefficient binary encode block 54 from FIG. 2; further, for sake of reference, the combined block of FIG. 6 is hereafter referred to as block 52/54. The blocks are combined because the diagram in FIG. 6 both implements the determination of the phase difference $\phi_2(n)$ represented in Equation 6 above and also encodes that difference into binary form, that is, into the corresponding value of $\omega_2(n)$. Lastly, by way of contrast, note that one approach in the prior art to computing a phase difference to maximize instantaneous power is achieved simply by a look-up table, but as will be appreciated below the preferred embodiment provides a less complex alternative to such an approach.

Looking to FIG. 6, the values $\alpha_{1,n}$ and $\alpha_{2,n}$ from channel measurement block 50 are input to the combined block 52/54. Specifically, these values are coupled to inputs 80$_1$ and 80$_2$ of a complex dot product block 80. Block 80 represents the function of determining the complex dot product of the values provided at its inputs 80$_1$ and 80$_2$. Thus, for the instance shown in FIG. 6, this product is as shown at the output 80$_3$ of block 80, and is also shown in the following Equation 7:

$$\text{output } 80_3 = \alpha_{1,n}{}^H\alpha_{2,n} \qquad \text{Equation 7}$$

Thus, block 80, as also shown by Equation 7, yields the product of the first two multiplicands in the term real$\{\alpha_{1,n}{}^H\alpha_{2,n}e^{j\phi_2(n)}\}$ from Equation 6.

The dot product output from complex dot product block 80 is coupled to an alternating switch 82. Switch 82 toggles to a first position for one slot, and then to a second position for the next slot; specifically, for a first slot $2i$ in a group of i slots, switch 82 connects the output of complex dot product block 80 to a real component extraction block 84 and so that for a second slot $2i+1$ in the group of i slots, switch 82 connects the output of complex dot product block 80 to an imaginary component extraction block 86.

Real component extraction block 84 operates to select and output only the real portion of the value provided at its input, and conversely, imaginary component extraction block 86 outputs only the imaginary portion of the value provided at its input. The output of real component extraction block 84 is coupled to a decision block 88 which also may be a comparator or comparing function, where if the real component from block 84 is greater than or equal to zero, then a block 90 is reached, while in contrast if the real component from block 84 is less than zero, then a block 92 is reached. The output of imaginary component extraction block 86 is coupled to a decision block 94 which may be a comparator or comparing function, where if the imaginary component from block 86 is less than or equal to zero, then a block 96 is reached, while in contrast if the imaginary component from block 86 is greater than zero, then a block 98 is reached.

The ultimate results produced by the operation of block 52/54 may be appreciated by one skilled in the art given the assignment of values shown in FIG. 6 in blocks 90, 92, 96 and 98. For a slot n=2i, it is shown later that decision block 88 directs the flow to either block 90 or block 92 based on the maximization of the term real$\{\alpha_{1,n}^H \alpha_{2,n} e^{j\phi_2(n)}\}$ from Equation 6 for $\phi_2(n) \in \{0,\pi\}$, and each of those two blocks 90 and 92 assigns to $\phi_2(n)$ one of the two different values shown in Table 3 for n=2i (i.e., 0 or $\pi$, respectively). Block 90 and block 92 also encode the value assigned to $\phi_2(n)$ into a corresponding binary counterpart $\omega_2(n)$, as also shown in Table 3. Also, for a slot n=2i+1, it is shown later that decision block 94 directs the flow to either block 96 or block 98 based on the maximization of the term real$\{\alpha_{1,n}^H \alpha_{2,n} e^{j\phi_2(n)}\}$ from Equation 6 for $\phi_2(n) \in \{\pm\pi/2\}$, and each of those two blocks 96 and 98 assigns to $\phi_2(n)$ one of the two different values shown in Table 3 for n=2i+1 (i.e., $\pi/2$ or $-\pi/2$, respectively). Block 96 and block 98 also encode the value assigned to $\phi_2(n)$ into a corresponding binary counterpart $\omega_2(n)$, as also shown in Table 3. Finally, note that the assigned values from any of blocks 90, 92, 96, and 98 are provided to the blocks shown in FIG. 2, that is, the value of $\omega_2(n)$ is fed back to base station 12 while the value of $\phi_2(n)$ is coupled to beamformer verification block 56.

An additional appreciation of the operation of block 52/54 with respect to the extraction of a real component by block 84 is now explored in still further detail, and from this discussion one skilled in the art should appreciate the additional benefits realized by the particular implementation of FIG. 6. Generally, real component extraction block 84, in combination with decision block 88, determines the value of $\phi_2(n)$ that maximizes instantaneous power, P(n), by taking advantage of certain complex arithmetic identities. In operating in this fashion, these blocks provide an architecture requiring less complexity than other computational or storage-intensive techniques. Blocks 84 and 88 deal with the case where $\phi_2(n) \in \{0,\pi\}$. Looking further at the implications of these two values for $\phi_2(n)$, note that with respect to the final multiplicand in the real portion of Equation 6 they produce the results shown in Equations 8 and 9:

$$e^{j0}=1 \qquad \text{Equation 8}$$

$$e^{j\pi}=-1 \qquad \text{Equation 9}$$

From Equations 8 and 9, it should be appreciated that to maximize P(n), the value of $\phi_2(n)$ must be such that the result of real$\{\alpha_{1,n}^H \alpha_{2,n} e^{j\phi_2(n)}\}$ is positive. For example, if real$\{\alpha_{1,n}^H \alpha_{2,n}\}$ is a positive value, then as between the two multiplicands from Equations 8 and 9, P(n) would be maximized by multiplying it times the resulting multiplicand of 1 from Equation 8, and indeed decision block 88 passes flow to block 90 in this case to thereby assign the value of 0 degrees to $\phi_2(n)$ because that value therefore maximizes P(n). As another example, if real$\{\alpha_{1,n}^H \alpha_{2,n}\}$ is a negative value, then P(n) would be maximized by multiplying it times the resulting multiplicand of $-1$ from Equation 9 to form a positive value product, and indeed decision block 88 passes flow to block 92 in this case to thereby assign the value of $\pi$ radians to $\phi_2(n)$ because that value therefore maximizes P(n). In either case, therefore, blocks 88, 90, and 92 yield this determination without requiring the additional complexity of having to perform an actual multiplication times $e^{j\theta}$.

An additional appreciation of the operation of block 52/54 with respect to the extraction of an imaginary component by block 86 is also now explored in still further detail, and from this discussion one skilled in the art should appreciate the additional benefits realized by the particular implementation of FIG. 6. Imaginary component extraction block 86 operates in combination with decision block 94, again to determine the value of $\phi_2(n)$ that maximizes instantaneous power, P(n), and also by taking advantage of certain complex arithmetic identities. Once more, therefore, an embodiment is provided that requires less complexity than other more computational or storage-intensive techniques. Blocks 86 and 94 deal with the case where $\phi_2(n) \in \{\pi/2,-\pi/2\}$. Looking further at the implications of these two values for $\phi_2(n)$, note that with respect to the final multiplicand $e^{j\phi_2(n)}$ in the real portion of Equation 6 they produce the following results shown in Equations 10 and 11:

$$e^{j(\pi/2)}=j \qquad \text{Equation 10}$$

$$e^{j(-\pi/2)}=-j \qquad \text{Equation 11}$$

Both Equations 10 and 11 produce imaginary results, and it is observed in connection with the preferred embodiment that these results, if multiplied times the real value in Equation 6, would have a sign-detectable effect on the imaginary portion of the result, as further appreciated from the following complex arithmetic principles. Again, to maximize P(n), the value of $\phi_2(n)$ must be such that the result of real$\{\alpha_{1,n}^H \alpha_{2,n} e^{j\phi_2(n)}\}$ is positive. However, in the case for slot 2i+1 where $\phi_2(n) \in \{\pi/2,-\pi/2\}$, and as shown in Equations 10 and 11, the value real$\{\alpha_{1,n}^H \alpha_{2,n} e^{j\phi_2(n)}\}$ includes the dot product from block 80 and multiplied times either j or $-j$. Further, the following Equations 12 through 15 demonstrate additional complex arithmetic principles that facilitate an understanding of blocks 86 and 94, where v and y are complex numbers and are multiplied times either j or $-j$ as shown:

$$v(j)=(a+jb)(j)=aj+j^2 b=aj-b \qquad \text{Equation 12}$$

$$v(-j)=(a+jb)(-j)=-aj-j^2 b=-aj+b \qquad \text{Equation 13}$$

$$y(j)=(c-jd)j=cj-j^2 d=cj+d \qquad \text{Equation 14}$$

$$y(-j)=(c-jd)(-j)=-cj+j^2 d=-cj-d \qquad \text{Equation 15}$$

Given the preceding, and again with the goal of maximizing P(n), Equations 12 through 15 demonstrate the following observations. Equation 13 versus Equation 12 demonstrates a larger real portion in the Equation 13 complex number product (i.e., b versus $-b$, making b the maximum of the two), and the two Equations further demonstrate that to achieve the result having a larger real portion, for a complex number with a positive imaginary value (i.e., b), then the complex number must be multiplied times $-j$. Thus, in the context of FIG. 6, if the complex dot product from block 80 has a positive imaginary value (which is extracted by block 86), then the product real$\{\alpha_{1,n}^H \alpha_{2,n} e^{j\phi_2(n)}\}$ is maximized when multiplied times $-j$, which occurs when $\phi_2(n)=-\pi/2$; indeed decision block 94 passes flow to block 98 in this case to thereby assign the value of $-\pi/2$ radians to $\phi_2(n)$. Conversely, Equation 14 versus Equation 15 demonstrates a larger real portion in the Equation 14 complex number product (i.e., d versus $-d$), and the two Equations further demonstrate that to achieve this maximum result, for a complex number with a negative imaginary value (i.e., d), then the complex number must be multiplied times j. Thus, in the context of FIG. 6, if the complex dot product from block 80 has a negative or zero imaginary value (which is extracted by block 86), then the product real$\{\alpha_{1,n}^H \alpha_{2,n} e^{j\phi_2(n)}\}$ is maximized when multiplied times j, which occurs when $\phi_2(n)=\pi/2$; indeed decision block 94 passes flow to block 96 in this case to thereby assign the value of $\pi/2$ radians to $\phi_2(n)$. In either event, therefore, a proper value of $\phi_2(n)$ is assigned to maximize P(n), and again without requiring the additional complexity of having to perform an actual multiplication times $e^{j\Theta}$.

Returning now to base station 12, a further discussion is provided of the broad range closed loop mode in response to a closed loop value (or values) fed back from user station 14. Recall first the above-introduced conventions, that is, user station 14 feeds back the value of $\omega_2(n)$ (and $\omega_1(n)$ if it is not normalized), but this fed back value undergoes the channel effects in the feedback channel so that the corresponding value actually received by base station 12 is designated $\tilde{\omega}_2(n)$. Given this value, feedback decode and process block 21 provides a two step operation, and for sake of simplification each of these steps is discussed separately below.

As a first operation of block 21 and in response to $\tilde{\omega}_2(n)$, block 21 determines an actual phase difference, designated as $\hat{\phi}_{2,T}(n)$, corresponding to $\tilde{\omega}_2(n)$; this determination is achieved by the mapping of Table 3. In other words, if for slot n=2i, $\tilde{\omega}_2(2i)$ equals a binary value of 0, then block 21 determines that $\hat{\phi}_{2,T}(2i)$ equals 0 degrees, whereas if $\tilde{\omega}_2(2i)$ equals a binary value of 1, then block 21 determines that $\hat{\phi}_{2,T}(2i)$ equals $\pi$ radians. Additionally, if for slot ,n=2i+1, $\tilde{\omega}_2(2i+1)$ equals a binary value of 0, then block 21 determines that $\hat{\phi}_{2,T}(2i+1)$ equals $\pi/2$ radians, whereas if $\tilde{\omega}_2(2i+1)$ equals a binary value of 1, then block 21 determines that $\hat{\phi}_{2,T}(2i+1)$ equals $-\pi/2$ radians.

A second operation of block 21 is in response to the determined value of $\hat{\phi}_{2,T}(n)$ described immediately above. Specifically, having received the value $\hat{\phi}_{2,T}(n)$, block 21 determines the actual multiplicands to be used multipliers 20$_1$ and 20$_2$. Recalling that $\omega_{1,T}(n)$ is normalized, in the preferred embodiment its actual normalized value as to be used by multiplier 18$_1$ is as set forth in the following Equation 16:

$$w_{1,T}(n) = \frac{1}{\sqrt{2}} \qquad \text{Equation 16}$$

Of course, since the Equation 16 value is constant, it may be provided only once by calculation or, indeed, it may be fixed in some storage element or the like. Looking to $\omega_{2,T}(n)$, however, it is based on the actual value of $\hat{\phi}_{2,T}(n)$ as determined above by block 21; moreover, in the preferred embodiment, the value of $\omega_{2,T}(n)$ is based on an average of two received values of $\hat{\phi}_{2,T}$ corresponding to two successive slots, that is, with respect to $\hat{\phi}_{2,T}(n)$ and $\hat{\phi}_{2,T}(n-1)$, as further set forth in the following Equation 17:

$$w_{2,T}(n) = \frac{1}{2}(e^{j\hat{\phi}_2(n)} + e^{j\hat{\phi}_2(n-1)}) \qquad \text{Equation 17}$$

Indeed, the two-slot averaging approach represented by Equation 17 demonstrates that the preferred embodiment reduces computational complexity and delay of the four-slot averaging approach implemented in connection with the prior art (e.g., Equation 5). Further, for purposes of analysis and discussion, the two addends within parenthesis of Equation 17 represent an addition in the complex plane and, thus, the following term may be defined with respect to Equation 17 to introduce a related factor of $\theta_T(n)$:

$$w_{2,T}(n) = \frac{1}{2}(e^{j\hat{\phi}_2(n)} + e^{j\hat{\phi}_2(n-1)}) \stackrel{def}{=} \frac{1}{\sqrt{2}} e^{j\theta_T(n)} \qquad \text{Equation 18}$$

Thus, Equation 18 defines $\theta_T(n)$ as the average of two received values of $\hat{\phi}_{2,T}$ corresponding to two successive slots; further, because for an even slot n, $\hat{\phi}_{2,T}(n) \in \{0,\pi\}$, and for an odd slot n, $$\hat{\phi}_{2,T}(n) \in \{\frac{\pi}{2}, \frac{-\pi}{2}\},$$

then the average between any one value from even slot n and an immediately preceding odd slot n−1 can take only one of four values, that is, $$\theta_T(n) \in \{\frac{\pi}{4}, \frac{3\pi}{4}, \frac{-3\pi}{4}, \frac{-\pi}{4}\}.$$

Further, given the results of Equations 17 and 18, the values of $\omega_{1,T}(n)$ and $\omega_{2,T}(n)$ are used by multipliers 20$_1$ and 20$_2$, respectively, thereby producing signals $\omega_{1,T}(n)S_i$ and $\omega_{2,T}(n)S_i$, which are transmitted by antennas A12$_1$ and A12$_2$, respectively, to user station 14.

With base station 12 having transmitted the signals $\omega_{1,T}(n)S_i$ and $\omega_{2,T}(n)S_i$ to user station 14 and according to the preferred broad range closed loop mode, attention is now further directed to the preferred beamformer verification by user station 14, as implemented in a preferred embodiment for channel estimation and beamformer verification block 56. Recall from the earlier introduction of beamformer verification that it arises from the recognition that a transmission by base station 12 may implement a weight value (e.g., $\omega_{2,T}(n)$) that is influenced by feedback channel effects, and beamformer verification in general is an attempt by user station 14 to ascertain the actual weight value used by base station 12. The ascerained value is then usable by user station 14 to determine the value of $\hat{h}_n$ to be used for maximal ratio combining in block 23. Further, in the preferred embodiment beamformer verification may be implemented using one of two different alternatives in the broad range closed loop mode. Each of these alternatives is discussed later.

Figure 7:
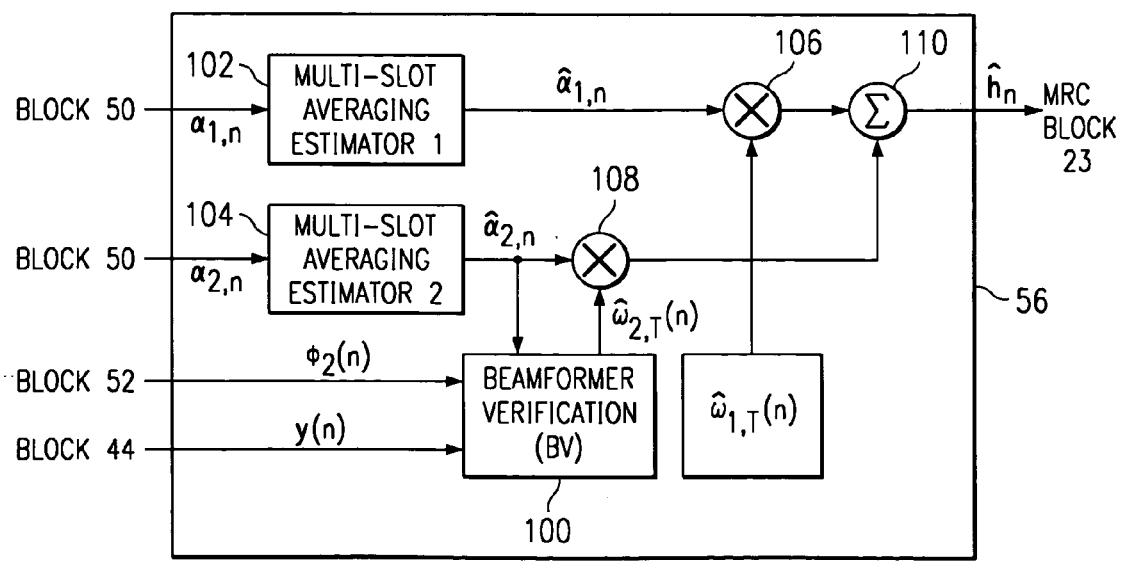
FIG. 7 illustrates a block diagram of channel estimation and beamformer verification block 56 from FIG. 2 and according to the preferred embodiment.

FIG. 7 illustrates a block diagram of channel estimation and beamformer verification block 56 in greater detail and it is now explored further in connection with the preferred embodiment. Recall from earlier that block 56 receives various inputs from other blocks in FIG. 2, including the values of the DPCH pilot symbols y(n) from pilot symbol extractor 44 and the phase difference values $\phi_1(n)$ and $\phi_2(n)$ from beamformer coefficient computation block 52 (or just $\phi_2(n)$ if $\phi_1(n)$ is normalized). As detailed further in FIG. 7, these inputs are coupled to a beamformer verification block 100. Further, block 56 also receives as inputs the channel measurement values $\alpha_{1,n}$ and $\alpha_{2,n}$ from channel measurement block 50, where the value $\alpha_{1,n}$ is connected as an input to a first multi-slot averaging estimator 102 while the value $\alpha_{2,n}$ is connected as an input to a second multi-slot averaging estimator 104. The outputs of estimators 102 and 104 provided estimates corresponding to the input values $\alpha_{1,n}$ and $\alpha 2_{2,n}$, and for sake of convention these estimates are identified as $\hat{\alpha}_{1,n}$ and $\hat{\alpha}_{2,n}$. The estimates $\hat{\alpha}_{1,n}$ and $\hat{\alpha}_{2,n}$ are connected as input multiplicands to respective multipliers 106 and 108, and the estimate $\hat{\alpha}_{2,n}$ is also connected as an input to beamformer verification block 100. The output of beamformer verification block 100 is the estimate by user station 14 of the value $\omega_{2,T}(n)$ used by base station 12, and for sake of reference, this output is identified as $\hat{\omega}_{2,T}(n)$. The value $\hat{\omega}_{2,T}(n)$ is also connected as a second input multiplicand to multiplier 108, while the value of $\hat{\omega}_{1,T}(n)$, shown in FIG. 7 as the constant from Equation 16, above, is connected as a second input multiplicand to multiplier 106. The product output of multipliers 106 and 108 are coupled to a adder 110, and which has an output that provides $\hat{h}_n$ to MRC block 23. Finally, the operation of channel estimation and beamformer verification block 56 is described below.

Estimators 102 and 104 refine the channel measurements provided as inputs to those estimators. In the preferred embodiment, each of estimators 102 and 104 computes a multi-slot average of its inputs to provide what is anticipated as a more accurate estimate, thereby represented as $\hat{\alpha}_{1,n}$ and $\hat{\alpha}_{2,n}$. Preferably, the multi-slot averaging technique used is the Weighted Multi-Slot Averaging technique known in the art which averages six slots for low to moderate channel fading rate with the weighting [0.3, 0.8, 1, 1, 0.8, 0.3], and four slots for high fading rate with the weighting [0.6, 1, 1, 0.6].

To appreciate the operation of the remaining blocks and items in block 56, first Equations 16 and 18 are substituted into Equation 4 to define the channel estimation in the form of the following Equation 19:

$$\hat{h}_n = \frac{1}{\sqrt{2}}(\alpha_{1,n} + e^{j\theta_T(n)}\alpha_{2,n}) \quad \text{Equation 19}$$

Given Equation 19, the values therein for $\alpha_{1,n}$ and $\alpha_{2,n}$ may be satisfied using the refined estimates, $\hat{\alpha}_{1,n}$ and $\hat{\alpha}_{2,n}$ from estimators 102 and 104, respectively. The operation of block 56 also endeavors to determine $\theta_T(n)$ to complete the determination of $\hat{h}_n$, and in the preferred embodiment this operation is achieved by beamformer verification block 100 in response to the value of the DPCH pilot symbols, y(n). First in this regard, note that in the preferred embodiment the pilot symbols, which recall differ for each of the different transmit antennas $A12_1$ and $A12_2$ are orthogonal with respect to one another. Second, in the preferred embodiment beamformer verification block 100 may operate in one of two different alternative methods for determining $\theta_T(n)$ in response to the orthogonal DPCH pilot symbols. Generally introducing these two alternatives, a first may be referred to as a two rotating hypothesis testing method, while a second may be referred to as a four hypothesis single shot testing method. Each alternative is separately discussed below.

Since both preferred beamformer verification methods determine $\theta_T(n)$ in response to the orthogonal DPCH pilot symbols, y(n), it is noted that such symbols may be written according to the following Equation 20:

$$y(n) = \frac{1}{\sqrt{2}}(b_1(n) + e^{j\theta_T(n)}b_2(n)) + \psi(n) \quad \text{Equation 20}$$

In Equation 20, $\psi(n)$ is a zero mean complex Guassian noise factor with per component variance of $\sigma^2$. Further, the vector b in Equation 20 is defined relative to $\alpha_{1,n}$ and $\alpha_{2,n}$ received by block 100 from estimator 104, and it may be written as in the following Equation 21:

$$b_k(n)^{def} = \begin{bmatrix} d_k(1)\alpha_{k,n} \\ \vdots \\ d_k(N_Y)\alpha_{k,n} \end{bmatrix} \quad \text{Equation 21}$$

In Equation 21, $\{d_k(1), \ldots, d_k(N_Y)\}$ is the DPCH pilot pattern for antenna k, and $N_Y$ is the number of pilot symbols per slot. Further, while Equations 20 and 21 (and others) provide ideal solutions, in providing a preferred embodiment implementation the estimate values may be used therein, such as through the use of $\hat{\alpha}_{2,n}$ in place of its ideal counterpart $\alpha_{2,n}$.

Finally, therefore, the beamformer verification is chosen by the preferred embodiment to maximize the aposteriori detecting probability, which as applied to Equation 21 may be represented generally by the following Equation 22:

$$\max_{m \in M}\left(\sqrt{2} \times \text{real}\left\{y^H(n)b_2(n)e^{j\tilde{\phi}^{(m)}}\right\} + \mu(m)\right) \quad \text{Equation 22}$$

where m is the indexing, $M \in \{1,2\}$ is the index set of the allowable $\tilde{\phi}^{(m)}$ values, $\mu(m)$ is a threshold parameter depending upon m. For n=2i, $\tilde{\phi}^{(1)}=0$ and $\tilde{\phi}^{(2)}=\pi$, and for n=2i+1, $$\tilde{\phi}^{(1)} = \frac{\pi}{2} \text{ and } \tilde{\phi}^{(2)} = \frac{-\pi}{2}.$$

Figure 8:
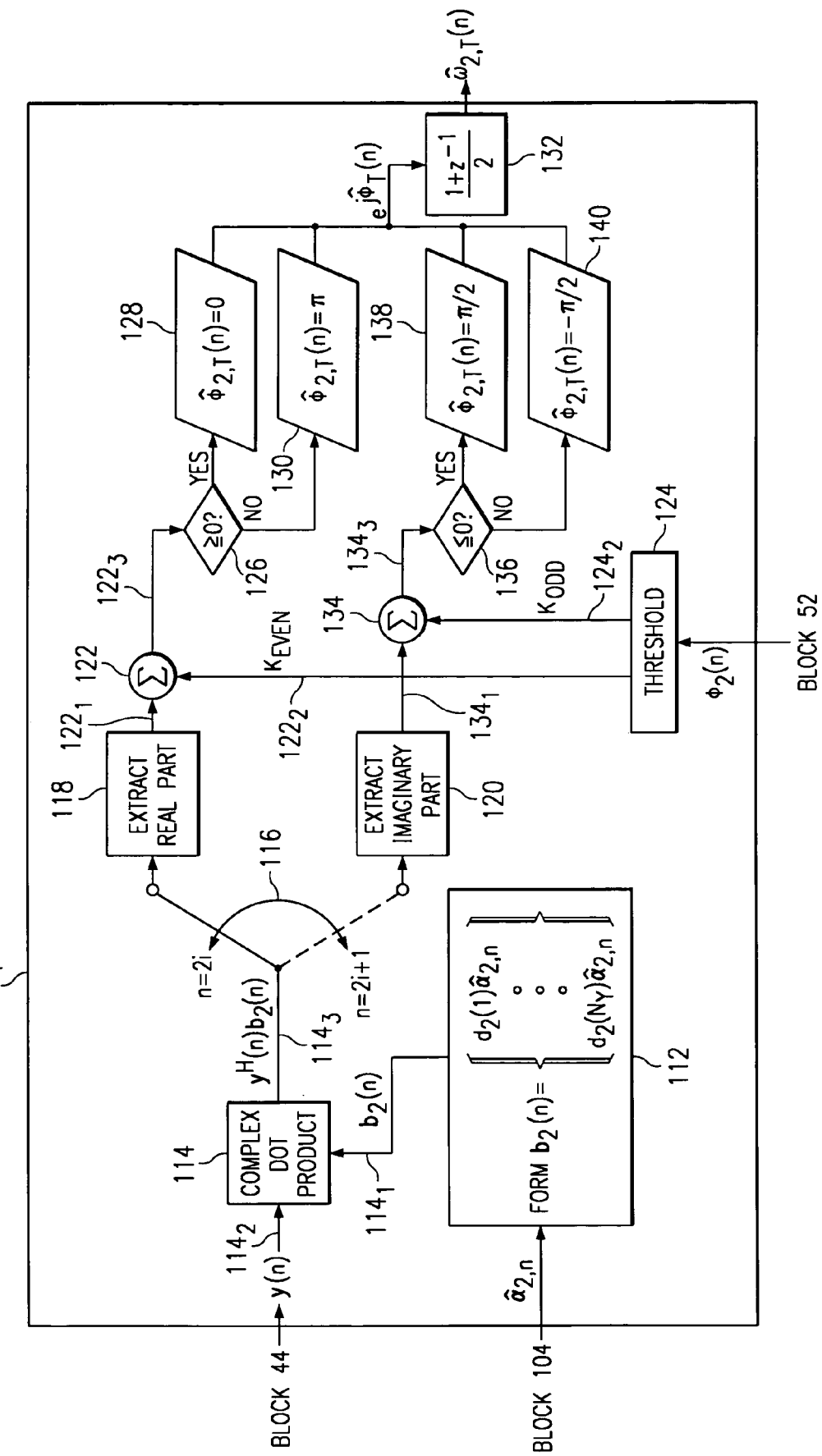
FIG. 8 illustrates a block diagram of a first implementation of a beamformer verification block $100_1$ that may readily implemented as beamformer verification block 100 from FIG. 7, and which operates according to a two rotating hypothesis testing method.

FIG. 8 illustrates a block diagram of a first implementation of a beamformer verification block $100_1$ that may be readily implemented as beamformer verification block 100 from FIG. 7, and which operates according to a two rotating hypothesis testing method detailed later. By way of introduction, block $100_1$ provides an estimated value designated $\hat{\omega}_{2,T}(n)$, which relates as shown below to the value $\tilde{\phi}^{(m)}$ in Equation 22. Further, the value of $\hat{\omega}_{2,T}(n)$ is, in effect, a prediction by user station 14 of what was used by base station 12 for a given slot n as its value for $\omega_{2,T}(n)$ to weight its signal before it was transmitted to user station 14.

Looking to FIG. 8 in greater detail, it includes a vector formation block 112 that determines the vector elements of $b_2(n)$ according to the product of each pilot data and the appropriate channel estimate $\alpha_{k,n}$ as shown in Equation 21, but note with respect to the value $\alpha_{k,n}$ that block 112 actually uses the refined value, $\hat{\alpha}_{2,n}$, provided by multi-slot averaging estimator 104. The vector $b_2(n)$ determined by block 112 is output as a multiplicand to an input $114_1$ of a complex dot product block 114, which receives at another input $114_2$ an additional multiplicand of the vector y(n) from DPCH pilot symbol extractor 44. Block 114 represents tile function of determining the complex dot product of the values provided at its inputs $114_1$ and $114_2$. Thus, for the instance shown in FIG. 8, this product is as shown at the output $114_3$ of block 114, and is also shown in the following Equation 23:

output $114_3 = y^H(n)b_2(n)$      Equation 23

Thus, block 114, as also shown by Equation 23, yields the product of the first two multiplicands in the term $\text{real}\{y^H(n)b_2(n)e^{j\tilde{\phi}^{(m)}}\}$ from Equation 22.

The product output from complex dot product block 114 is coupled to an alternating switch 116. Switch 116 toggles to a first position for the first slot 2i in a group of i slots, thereby connecting the output 114₃ of complex dot product block 114 to a real component extraction block 118, and switch 116 toggles to a second position for the second slot 2i+1, thereby connecting the output 114₃ of complex dot product block 116 to an imaginary component extraction block 120.

Real component extraction block 118 operates to select and output only the real portion of the value provided at its input, and this real portion is provided as an addend to a first input 122₁ of an adder 122, while the second input 122₂ of adder 122 receives a threshold value designated $\kappa_{even}$ from a threshold block 124. The output 122₃ of adder 122 is connected to a decision block 126 which may be a comparator or comparing function, where if the sum from output 122₃ is greater than or equal to zero, then a block 128 is reached, while in contrast if the sum is less than zero, then a block 130 is reached. Blocks 128 and 130 each assign a phase different value to $\hat{\phi}_{2,T}(n)$ as shown in FIG. 8 (i.e., 0 and π, respectively), and that value is output to a two-slot averaging block 132. The output of two-slot averaging block 132 is the final value $\hat{\omega}_{2,T}(n)$ output by block 100₁, and is connected in the manner shown and described above relative to FIG. 7.

Imaginary component extraction block 120 operates to select and output only the imaginary portion of the value provided at its input, and this imaginary portion is provided as an addend to a first input 134₁ of an adder 134, while the second input 134₂ of adder 134 receives a threshold value designated $\kappa_{odd}$ from threshold block 124. The output 134₃ of adder 134 is connected to a decision block 136 which may be a comparator or comparing function, where if the sum from output 134₃ is less than or equal to zero, then a block 138 is reached, while in contrast if the sum is greater than zero, then a block 140 is reached. Blocks 138 and 140 each assign a phase different value to $\hat{\phi}_{2,T}(n)$ as shown in FIG. 8 (i.e., π/2 or −π/2, respectively), and that value is output to two-slot averaging block 132.

Threshold block 124 provides the threshold values $\kappa_{even}$ and $\kappa_{odd}$ to adders 122 and 134, respectively, as introduced above. The following discussion explores the generation of these values, while the effect in response to them is discussed later in the overall operation of block 100₁. With respect to the generation of these values, note the following four observations. First, the subscripted identifiers of "even" and "odd" for the threshold values corresponds to the slot being analyzed by block 100₁, that is, whether the value of n is an even number (e.g., 2i) or the value of n is an odd number (e.g., 2i+1). Thus, $\kappa_{even}$ is determined and used for slots where n is an even number, and $\kappa_{odd}$ is determined and used for slots where n is an odd number. Second, recall that beamformer coefficient computation block 52 provides the computed phase difference value $\phi_2(n)$ to beamformer verification block 100, and which is shown as an input to threshold block 124 in FIG. 8. In effect, therefore, threshold block 124 has a stored phase difference value corresponding to what user station 14 last fed back to base station 12. Third, user station 14 includes any one or more of various algorithms known in the art whereby user station 14 will have some measure of feedback error rate as a measure between 0 and 1, and which in this document is represented as ε (i.e., ε∈(0,1)). Fourth, as should be understood from the following, $\kappa_{even}$ is the apriori probability of occurrence for $\omega_{2,n} \in \{0, \pi\}$ in view of $\phi_2(n)$ from block 52, while $\kappa_{odd}$ is the apriori probability of occurrence for $$\omega_{2,n} \in \left\{\frac{\pi}{2}, \frac{-\pi}{2}\right\}$$

in view of $\phi_2(n)$ from block 52.

Given the preceding, $\kappa_{even}$ and $\kappa_{odd}$ are determined by threshold block 124 according to the following Equations 24 and 25.

$$\kappa_{even} = \frac{\hat{\sigma}^2}{2\sqrt{2}} \ln \rho_{even}(\phi_2(n)) \qquad \text{Equation 24}$$

$$\kappa_{odd} = \frac{\hat{\sigma}^2}{2\sqrt{2}} \ln \rho_{odd}(\phi_2(n)) \qquad \text{Equation 25}$$

$\hat{\sigma}^2$ in Equations 24 and 25 is the estimate of noise variance $\sigma^2$, as defined above in connection with Equation 20. Further, the natural logarithms in Equations 24 and 25 are based on the functions of $\rho_{even}(\phi(n))$ and $\rho_{odd}(\phi(n))$, respectively, and those functions are defined according to Equation 26 through 29, which how each function value is based on the value of $\phi_2(n)$ received by threshold block 124 from block 52.

$$\rho_{even} = \frac{1-\varepsilon}{\varepsilon}, \text{ for } \phi_2(n) = 0 \qquad \text{Equation 26}$$

$$\rho_{even} = \frac{\varepsilon}{1-\varepsilon}, \text{ for } \phi_2(n) = \pi \qquad \text{Equation 27}$$

$$\rho_{odd} = \frac{1-\varepsilon}{\varepsilon}, \text{ for } \phi_2(n) = \frac{-\pi}{2} \qquad \text{Equation 28}$$

$$\rho_{odd} = \frac{\varepsilon}{1-\varepsilon}, \text{ for } \phi_2(n) = \frac{\pi}{2} \qquad \text{Equation 29}$$

The overall operation of block 100₁ is now explored. Generally, block 100₁ determines which of the four constellation values, that is, for an even slot n, $\hat{\phi}_{2,T}(n) \in \{0, \pi\}$, and for an odd slot n, $$\hat{\phi}_{2,T}(n) \in \left\{\frac{\pi}{2}, \frac{-\pi}{2}\right\},$$

produces the solution to Equation 22, that is, the maximum value, and from Equation 21, it is readily appreciated that this maximum relates to the dot product of: (1) the DPCH pilot symbols (i.e., y(n)); and (2) the product of the refined channel estimates (i.e., $\hat{\alpha}_{2,n}$, derived by averaging and in response to the PCCPCH pilot symbols) times the PCCPCH pilot symbols. The following operation of block 100₁, and as appreciated given its comparable nature to some of the operation of FIG. 6, extracts real or imaginary portions of this dot product and determines for which value of $\phi_2(n)$ a maximum would be obtained if that value were multiplied times the dot product. As appreciated from the following operational description, however, this approach reduces the overall arithmetic complexity by initially not treating the aspect that, as discussed above, when $\omega_{2,T}(n)$ is determined by feedback decode and process block 21 according to the preferred embodiment, it is an average in response to two successive feedback values, as also shown in Equation 17. Given this introduction, the operation of switch 116 is such that for each even slot, that is, n as an even number (e.g., 2i), then only the two constellation values {0, π} are considered, where for each odd slot, that is, n as an odd number (e.g., 2i+1), then only the two constellation values {π/2, −π/2} are considered. Further, some of the reduction in complexity is achieved using complex number principles described earlier in connection with FIG. 6 and, thus, the reader is assumed familiar with that discussion and it is not repeated in considerable detail in connection with FIG. 8.

The operation of real component extraction block 118 of block 100$_1$ and the response to its output is now described, and is shown to determine an estimated value $\hat{\phi}_{2,T}(n)$ that yields a maximum result for Equation 22. Real component extraction block 118 and the blocks associated with its output deal with the case where n is even, and $\hat{\phi}_{2,T}(n) \in \{0,\pi\}$. This extracted real portion is then summed by adder 122 with a threshold from threshold block 124 of $\kappa_{even}$ because n is even, and from the previous discussion of the calculation of $\kappa_{even}$ one skilled in the art should appreciate that $\kappa_{even}$ is a non-zero number. This resulting sum is provided by output 122$_3$ to decision block 126. Decision block 126 directs the flow in a manner that may be appreciated from the earlier discussion of Equations 8 and 9. Specifically, from Equations 8 and 9 it should be appreciated that the two alternatives to which block 126 may direct the value of $\hat{\phi}_{2,T}(n)$, namely, $\hat{\phi}_{2,T}(n)=0$ or $\hat{\phi}_{2,T}(n)=\pi$, provide either a multiplicand of 1 or −1, respectively, for the term $e^{j\phi_m}$ in Equation 22. Thus, if the portion of the product in Equation 22 other than the term $e^{j\phi_m}$ in real{$y^H(n)b_2(n)e^{j\phi^{(m)}}$}, plus the $\kappa_{even}$ threshold from block 124, is positive, then a maximum of Equation 22 is realized if that sum is multiplied times the multiplicand of 1 which corresponds to the case of $\hat{\phi}_{2,T}(n)=0$, and this solution is realized when decision block 126 detects that real{$y^H(n)b_2(n)$} is positive, and directs the flow to block 128 which thereby assigns a value of 0 degrees to $\hat{\phi}_{2,T}(n)$. Alternatively, if the portion of the product in Equation 22 other than the term $e^{j\phi^{(m)}}$ in real{$y^H(n)b_2(n)e^{j\phi^{(m)}}$}, plus the $\kappa_{even}$ threshold from block 124, is negative, then a maximum of Equation 22 is realized if that remainder is multiplied times the multiplicand of −1 which corresponds to the case of $\hat{\phi}_{2,T}(n)=\pi$, and this solution is realized when decision block 126 detects that real{$y^H(n)b_2(n)$} is negative and directs the flow to block 130 which thereby assigns a value of π radians to $\hat{\phi}_{2,T}(n)$. From the preceding, one skilled in the art should appreciate that Equation 22 is generally maximized by block 100$_1$ when n is even, but with the added aspect that the feedback error rate, $\epsilon$, also may determine in part the determination of $\hat{\phi}_{2,T}(n)$. Specifically as to the latter, one skilled in the art may confirm that when $\epsilon$ is relatively low then there is a greater likelihood that $\hat{\phi}_{2,T}(n)$ will be assigned to be the same value of $\phi_2(n)$ as earlier determined by block 52, and provided by block 52 to block 100$_1$. Finally, note also that blocks 118, 126, 128, and 130 yield a solution to Equation 22 without requiring the additional complexity of having to perform an actual multiplication times $e^{j\theta}$.

The operation of imaginary component extraction block 120 and the response to its output is now described, and it too determines a value of $\hat{\phi}_{2,T}(n)$ that yields an estimated maximum result for Equation 22. Imaginary component extraction block 120 and the blocks associated with its output deal with the case where n is odd, and $$\hat{\phi}_{2,T}(n) \in \left\{\frac{\pi}{2}, \frac{-\pi}{2}\right\}.$$

The extracted imaginary portion is summed by adder 134 with a threshold from threshold block 124 of $\kappa_{odd}$ because n is odd, and $\kappa_{odd}$, like $\kappa_{even}$, is also a non-zero number that may shift the extracted imaginary portion from block 120 in response to the sign and magnitude of $\kappa_{odd}$. The resulting sum from adder 134 is provided by its output 134$_3$ to decision block 134, which directs the flow in a manner that may be appreciated from the earlier discussion of Equations 10 and 11. Specifically, from Equations 10 and 11 it should be appreciated that the two alternatives to which block 134 may direct the value of $\hat{\phi}_{2,T}(n)$, namely, $$\hat{\phi}_{2,T}(n) = \frac{\pi}{2} \text{ or } \hat{\phi}_{2,T}(n) = \frac{-\pi}{2},$$

provide either a multiplicand of j or −j, respectively, for the term $e^{j\phi^{(m)}}$ in Equation 22. Further, to maximize the term real{$y^H(n)b_2(n)$} from Equation 22 by multiplying times one of these multiplicands in terms of the term $e^{j\phi^{(m)}}$, then for a complex number with a positive imaginary portion (extracted by block 120), then the complex number must be multiplied times −j. Thus, in the context of FIG. 8, if the complex dot product from block 120, after summing with the threshold $\kappa_{odd}$ by adder 134, has a positive imaginary portion, then the product real{$y^H(n)b_2(n)e^{j\phi^{(m)}}$} is maximized when $\phi_2(n)=-\pi/2$, and indeed decision block 134 passes flow to block 140 in this case to thereby assign the value of −π/2 radians to $\hat{\phi}_{2,T}(n)$. Conversely, for a complex number with a negative or zero imaginary portion, then to maximize the number by multiplying times one of the multiplicands in terms of the term $e^{j\phi_m}$ the complex number must be multiplied times j. Thus, in the context of FIG. 8, if the complex dot product from block 120, after summing with the threshold $\kappa_{odd}$ by adder 134, has a negative or zero imaginary value, then the product real{$y^H(n)b_2(n)e^{j\phi^{(m)}}$} is maximized when $\phi_2(n)=\pi/2$, and indeed decision block 134 passes flow to block 138 in this case to thereby assign the value of π/2 radians to $\hat{\phi}_{2,T}(n)$. Thus, the preceding demonstrates that Equation 22 is generally maximized by block 100$_1$ when n is odd, but again with the added ability to offset this determination in view of the relative value of the feedback error rate, $\epsilon$.

Concluding the discussion of block 100$_1$, each value of $\hat{\phi}_{2,T}(n)$ determined by block 128 or 130 for an even slot n or by block 138 or block 140 for an odd slot n is connected to an input of two-slot averaging block 132. Block 132 operates to produce, as its output value $\hat{\omega}_{2,T}(n)$, the average of the two most recently-received values of $\hat{\phi}_{2,T}(n)$ and $\hat{\phi}_{2,T}(n-1)$. Accordingly, this averaging technique approximates the operation of base station 12 in that it averages in response to two successive beamformer coefficients as described earlier with respect to Equation 17. Further, with respect to block 100$_1$, its operation has now shown why the preferred embodiment was introduced earlier to use a type of beamformer verification identified as two rotating hypothesis testing. Specifically from FIG. 8, it may be seen that for each slot n, one of two hypotheses are tested, that is, for an even slot n, the two hypotheses correspond to $\hat{\phi}_{2,T}(n) \in \{0,\pi\}$, and for an odd slot n, the two hypotheses correspond to $$\hat{\phi}_{2,T}(n) \in \left\{\frac{\pi}{2}, \frac{-\pi}{2}\right\}.$$

Further, the testing is said to rotate in that it alternates between each set of two hypotheses according to whether n is odd or even.

Figure 9:
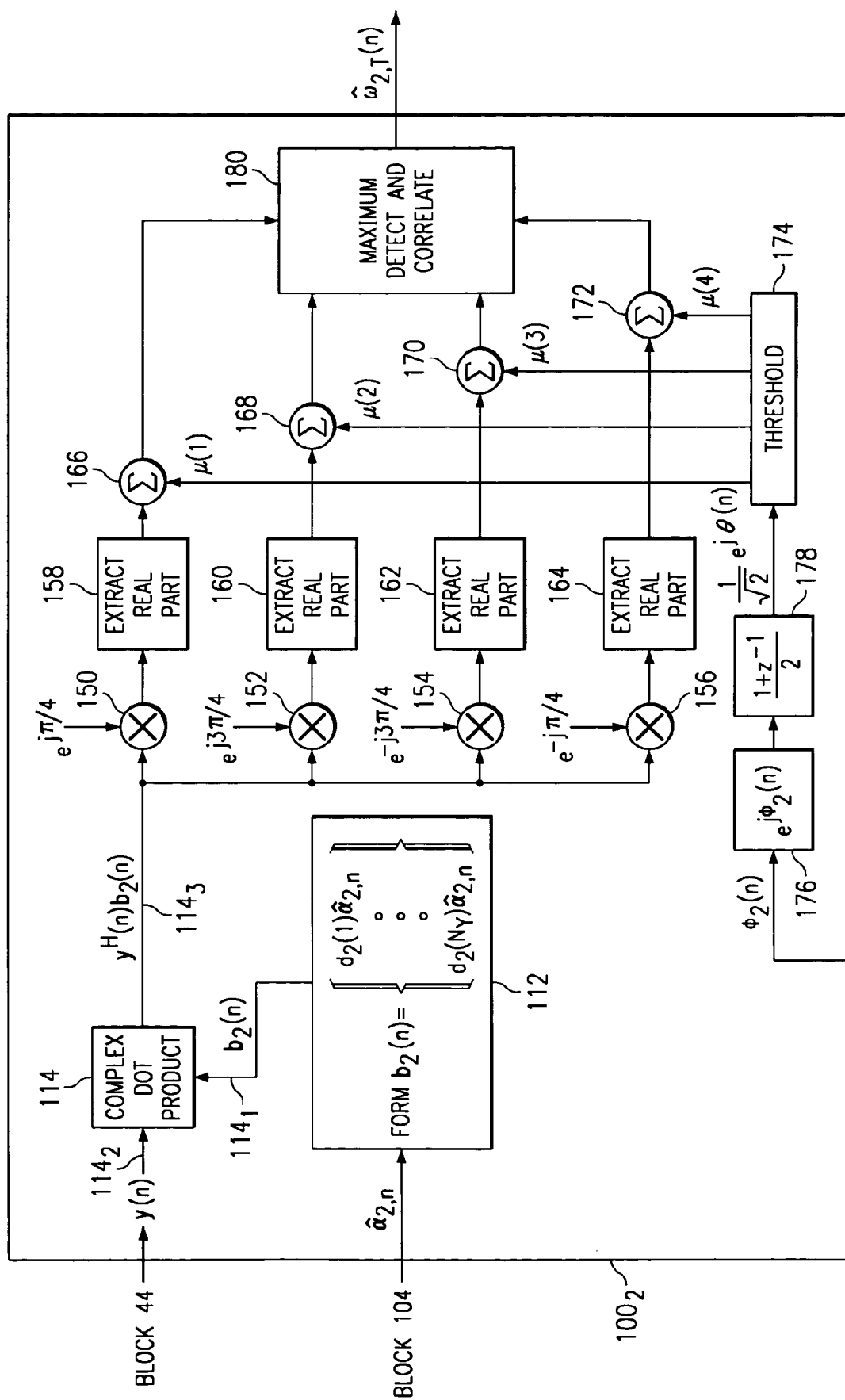
FIG. 9 illustrates a block diagram of a second implementation of a beamformer verification block $100_2$ that also may be implemented as beamformer verification block 100 from FIG. 7, and which operates according to a four hypothesis single shot testing.

FIG. 9 illustrates a block diagram of a second implementation of a beamformer verification block $100_2$ that also may be implemented as beamformer verification block 100 from FIG. 7. Block $100_2$ operates according to a four hypothesis single shot testing as apparent later and produces an estimated value designated $\omega_{2,T}(n)$, which relates the value $\hat{\theta}^{(m)}$ in the following Equation 30.

$$\max_{m \in M}\left(\text{real}\left\{y^H(n)b_2(n)e^{j\hat{\theta}^{(m)}}\right\} + \mu(m)\right) \quad \text{Equation 30}$$

where m is the indexing, $M \in \{1, 2, 3, 4\}$ is the index set of the allowable $\hat{\theta}^{(m)}$ values, $\mu(m)$ is a threshold parameter depending upon m, and where $$\hat{\theta}^{(1)} = \frac{\pi}{4}, \hat{\theta}^{(2)} = \frac{3\pi}{4}, \hat{\theta}^{(3)} = \frac{-3\pi}{4}, \text{ and } \hat{\theta}^{(4)} = \frac{-\pi}{4}.$$

Block $100_2$ shares some components with block $100_1$ of FIG. 8 and described earlier, and for such components like reference numbers are carried forward from FIG. 8 into FIG. 9; thus, briefly addressing those items, they include the same input values y(n), $\hat{\alpha}_{2,n}$, and $\phi_2(n)$, and the vector formation block 112 that determines the vector elements of $b_2(n)$ as well as the complex dot product block 114 which produces the result shown above in Equation 23. The remaining aspects of block $100_2$ differ in various manners from block $100_1$, as further detailed below.

The dot product from block 114 is connected via its output as a first multiplicand to four different multipliers 150, 152, 154, and 156. Further, each of multipliers 150, 152, 154, and 156 receives a respective second multiplicand $$e^{j\frac{\pi}{4}}, e^{j\frac{3\pi}{4}}, e^{j\frac{-3\pi}{4}}, \text{ and } e^{j\frac{-\pi}{4}}.$$

By way of explanation of these second multiplicands and introduction to the overall operation of block $100_2$, block $100_2$ more directly addresses the two-slot averaging performed by base station 12 described earlier with respect to Equation 17 as compared to block $100_1$ of FIG. 8. Further, it was demonstrates above that given an average between even and odd slots, the constellation for $\hat{\theta}^{(m)}$ is the four values in the set $$\left\{\frac{\pi}{4}, \frac{3\pi}{4}, \frac{-3\pi}{4}, \frac{-\pi}{4}\right\}$$

as appreciated below this entire constellation is considered by block $100_2$ in one parallel operation. The output of each of multipliers 150, 152, 154, and 156 is connected as an input to a respective one of real component extraction blocks 158, 160, 162, and 164, which extract the real portion of their input values and provide respective outputs as a first addend to a respective adder 166, 168, 170 and 172. Each adder 166, 168, 170 and 172 also receives a second addend from a threshold block 174.

Further with respect to threshold block 174, the value of $\phi_2(n)$ from block 52 is input to an exponential calculation block 176 which determines and outputs the value $e^{j\phi_2(n)}$. This output is connected to a two-slot averaging block 178 which therefore provides the output value $$\frac{e^{j\theta(n)}}{\sqrt{2}}$$

in response to two successive values, namely, $e^{j\phi_2(n)}$ and $e^{j\phi_2(n-1)}$, and this output is the input to threshold block 174. Further, threshold block 174, like threshold block 124 from FIG. 8, is also responsive to the feedback bit error rate, $\epsilon$. For block $100_2$ of FIG. 9, however, since its determination relative to Equation 30 is more precise by considering the four value constellation for $\hat{\theta}^{(m)}$, then further in this regard, the determination of the threshold from block 174 is more complex. Specifically, threshold block 174 determines the actual value of $\mu(m)$ from Equation 30, in response to $\epsilon$, and based on the corresponding value of $\theta(n)$, as shown in the following Table 4:

TABLE 4

$$\mu(m) = \frac{\hat{\sigma}^2}{\sqrt{2}} \ln \rho_m(\theta(n)), m = 1, 2, 3, 4$$

| | $\theta(n) = \frac{\pi}{4}$ | $\theta(n) = \frac{3\pi}{4}$ | $\theta(n) = \frac{-3\pi}{4}$ | $\theta(n) = \frac{-\pi}{4}$ |
|---|---|---|---|---|
| $\rho_1(\theta(n))$ | $(1-\epsilon)^2$ | $\epsilon(1-\epsilon)$ | $\epsilon^2$ | $\epsilon(1-\epsilon)$ |
| $\rho_2(\theta(n))$ | $\epsilon(1-\epsilon)$ | $(1-\epsilon)^2$ | $\epsilon(1-\epsilon)$ | $\epsilon^2$ |
| $\rho_3(\theta(n))$ | $\epsilon^2$ | $\epsilon(1-\epsilon)$ | $(1-\epsilon)^2$ | $\epsilon(1-\epsilon)$ |
| $\rho_4(\theta(n))$ | $\epsilon(1-\epsilon)$ | $\epsilon^2$ | $\epsilon(1-\epsilon)$ | $(1-\epsilon)^2$ |

Further from Table 4, the appropriate value is determined based on m and is provided to the one of adders 166, 168, 170 and 172 corresponding to the same value for $\theta(n)$. For example, for a given value of m and for $$\theta(n) = \frac{\pi}{4},$$

the determined threshold, $\mu(m)$ is provided to adder 166. In any event, each value $\mu(m)$ is summed with the corresponding outputs from real component extraction blocks 158, 160, 162, and 164.

The output of each of adders 166, 168, 170 and 172 is connected as an input to a maximum detection and correlation circuit 180. As further detailed below, circuit 180 determines the largest of its four inputs, and then selects the value of $\theta(n)$ that correlates to that value. For example, if the maximum input is from adder 166, then circuit 180 detects that value and correlates the value of $$\theta(n) = \frac{\pi}{4}$$

to that maximum value. Similarly, therefore, one skilled in the art will appreciate the comparable correlation by circuit 180 of $$\theta(n) = \frac{3\pi}{4}$$

to a maximum value from adder 168, or of $$\theta(n) = \frac{-3\pi}{4}$$

to a maximum value from adder 170, or of $$\theta(n) = \frac{-\pi}{4}$$

to a maximum value from adder 172. In any event, the correlated value of $\theta(n)$ is then output by block 100₂ as the value $\hat{\omega}_{2,T}(n)$.

An additional detailed explanation of the operation of block 100₂ should not be necessary to facilitate the understanding of such operation by one skilled in the art given the many preceding discussions of comparable blocks, the operational description above of the various blocks within block 100₂, and the terms in Equation 30. Briefly, therefore, the output of dot product block 114 is multiplied times each possible value of $\theta(n)$ by multipliers 150, 152, 154, and 156, and the real portion of the result of each multiplication is extracted thereby providing the term $\text{real}\{y^H(n)b_2 e^{j\theta^{(m)}}\}$ from Equation 30. In addition, the operation of threshold adjustments by block 174 and the respective adders is comparable to that described earlier with respect to block 100₁, and is further shown in that Equation 30 includes the added term of $\mu(m)$. Lastly, block 180 selects the maximum solution, as is the goal of Equation 30.

Concluding the discussion of block 100₂, an embodiment is provided to solve Equation 30, but it is noted that it is relatively more complex than that of block 100₁ in FIG. 8. For example, block 100₂ requires four complex multiplications that are not required by block 100₁. On the other hand, block 100₂ directly contemplates the effects of the two-slot averaging performed by base station 12 described earlier with respect to Equation 17. Thus, one skilled in the art may select between blocks 100₁ and 100₂ in view of these considerations as well as other design factors or criteria. Finally, with respect to block 100₂ its operation has now shown why it was described before to operate as a four hypothesis single shot testing method in that, for each slot n, four hypotheses are tested in a single parallel operation, where the four hypotheses correspond to the cases of $$\theta(n) = \left\{\frac{\pi}{4}, \frac{3\pi}{4}, \frac{-3\pi}{4}, \frac{-\pi}{4}\right\}.$$

From the above, it may be appreciated that the above embodiments provide a single broad range closed loop mode as a replacement to the prior art modes 1 and 2. The preferred broad range closed loop mode provides numerous advantageous. For example, the constellation rotation per slot enables $\omega_{2,T}(n)$ to encompass an effective constellation of four possible values (i.e., 2 values/slot*2 slots/rotation cycle=4 values), and this in conjunction with the smoothing average filter result in an acceptable resolution along with the reduction of effective feedback delay for low to moderate channel fading rate. As another example, the broad range closed loop mode of the preferred embodiments has been simulated to provide results that match or exceed those of the prior art modes 1 and 2, but the preferred embodiment use of a single mode in place of the two prior art modes eliminates the need, and corresponding complexity and delay, associated with the prior art requirement of switching back and forth between modes 1 and 2. As still another benefit, the preceding teachings may be applied to a base station with a number of antennas x greater than two antennas; in this case, again a first value $\omega_1(n)$ may be normalized while user station 14 determines the values of $\phi(n)$ for each of the other x antennas, and a corresponding weight is assigned to each of those values and fed back to the base station. Again, the determination of $\phi(n)$ would be made to maximize instantaneous power which may be derived as an extension of Equation 6. As yet another example, the preferred broad range closed loop mode may be combined with the prior art mode 3 to accommodate the full Doppler fading range in Table 1. As yet another example of the illustrated benefits, alternative methods for beamformer verification have been provided. As a final example, the present teachings may apply to systems other than CDMA, which by way of example could include time division multiple access ("TDMA") and orthogonal frequency division multiplexing ("OFDM"). Indeed, while the present embodiments have been described in detail, various additional substitutions, modifications or alterations could be made to the descriptions set forth above without departing from the inventive scope which is defined by the following claims.

The invention claimed is:

1. A method of transmitting information, comprising the steps of:
   receiving an information signal;
   receiving at least one coefficient from a remote communication system;
   averaging at least one coefficient over a plurality of slots, wherein the at least one coefficient is phase rotated by 90 degrees in each successive slot;
   producing a plurality of weighted information signals from the at least one coefficient and the information signal; and
   transmitting the plurality of weighted information signals from respective antennas.

2. A method as in claim 1, comprising the steps of:
   encoding the information signal;
   interleaving the information signal;
   symbol mapping the information signal; and
   modulating the information signal.

3. A method as in claim 1, wherein the step of producing a plurality of weighted information signals comprises the steps of:
   multiplying the information signal by a first coefficient, thereby producing a first weighted information signal; and
   multiplying the information signal by a second coefficient, thereby producing a second weighted information signal.

4. A method as in claim 3, comprising the steps of:
   transmitting the first weighted information signal from a first antenna; and
   transmitting the second weighted information signal from a second antenna.

5. A method as in claim 1, wherein the respective coefficients correspond respectively to previously transmitted weighted information signals.

6. A method as in claim 1, comprising the steps of:
   transmitting a first set of pilot symbols over a common pilot channel; and
   transmitting a second set of pilot symbols and the weighted information signals over a dedicated physical channel (DPCH).

7. A method as in claim 1, wherein the averaging step produces an average coefficient $$\omega_{2,T}(n) = \frac{1}{2}(e^{j\phi_2(n)} + e^{j\phi_2(n-1)})$$

over time slots n and n−1.

8. A method as in claim 7, wherein $\phi_2(n) \in \{0,\pi\}$, and wherein $\phi_2(n-1) \in \{\pi/2, -\pi/2\}$.

9. A method as in claim 7, comprising the step of producing a normalized coefficient.

$$\omega_{1,T}(n) = \frac{1}{\sqrt{2}}.$$

10. A method as in claim 9, wherein the step of producing a plurality of weighted information signals comprises multiplying the information signal by $\omega_{1,T}(n)$ and by $\omega_{2,T}(n)$.

11. A method of producing a coefficient in an electronic apparatus, comprising the steps of:
   receiving in said electronic apparatus a first coefficient corresponding to an even time slot;
   determining a phase angle is 0 when the first coefficient is 0;
   determining the phase angle is π when the first coefficient is 1;
   receiving in said electronic apparatus a second coefficient corresponding to an odd time slot;
   determining the phase angle is π/2 when the second coefficient is 0; and
   determining the phase angle is −π/2 when the second coefficient is 1.

12. A method as in claim 11, wherein the first and second coefficients are received from a remote wireless transmitter.

13. A method as in claim 11, comprising the step of averaging the first and second coefficients, wherein the second coefficient is phase rotated by 90 degrees with respect to the first coefficient.

14. A method as in claim 13, comprising the step of producing a third coefficient $$\omega_{2,T}(n) = \frac{1}{2}(e^{j\phi_2(n)} + e^{j\phi_2(n-1)})$$

in response to the step of averaging, wherein n and n−1 are indices of sequential time slots.

15. A method as in claim 14, comprising the step of producing a fourth coefficient.

$$\omega_{1,T}(n) = \frac{1}{\sqrt{2}}.$$

16. A method as in claim 15, comprising the steps of:
   multiplying an information signal by the third coefficient, thereby producing a first weighted information signal; and
   multiplying the information signal by the fourth coefficient, thereby producing a second weighted information signal.

17. A method of producing a coefficient, comprising the steps of:
   receiving a first coefficient corresponding to an even time slot;
   determining a phase angle is 0 whe the first coefficient is 0;
   determining the phase angle is π when the first coefficient is 1;
   receiving a second coefficient corresponding to an odd time slot;
   determining the phase angle is π/2 when the second coefficient is 0;
   determining the phase angle is −π/2 when the second coefficient is 1;
   averaging the first and second coefficients, wherein the second coefficient is phase rotated by 90 degrees with respect to the first coefficient;
   producing a third coefficient $$\omega_{2,T}(n) = \frac{1}{2}(e^{j\phi_2(n)} + e^{j\phi_2(n-1)})$$

in response to the step of averaging, wherein n and n−1 are indices of sequential time slots;
   producing a fourth coefficient;

$$\omega_{1,T}(n) = \frac{1}{\sqrt{2}};$$

multiplying an information signal by the third coeficient, thereby producing a first weighted information signal;
   multiplying the intormation signal by the fourth coefficient, thereby producing a second weigthed information signal; and
   transmitting the first weighted information signal from a first antenna; and
   transmitting the second weighted information signal front a second antenna.

18. A method of calculating a coefficient, comprising:
   receiving at least one coefficient from a remote communication system;

averaging at least one coefficient over a plurality of slots, wherein the at least one coefficient is phase rotated by 90 degrees in each successive slot; and producing a plurality of weighted information signals from the at least one coefficient and an information signal.

19. A method as in claim 18, wherein the step of producing a plurality of weighted information signals comprises the steps of:

multiplying the information signal by a first coefficient, thereby producing a first weighted information signal; and multiplying the information signal by a second coefficient, thereby producing a second weighted information signal.

20. A method as in claim 18, wherein the respective coefficients correspond respectively to previously transmitted weighted information signals.

21. A method as in claim 18, wherein the averaging step produces an average coefficient $$\omega_{2,T}(n) = \frac{1}{2}(e^{j\phi_2(n)} + e^{j\phi_2(n-1)})$$

over time slots n and n−1.

22. A method as in claim 21, wherein $\phi_2(n) \in \{0,\pi\}$, and wherein $\phi_2(n-1) \in \{\pi/2,-\pi/2\}$.

23. A method as in claim 21, comprising the step of producing a normalized coefficient $$\omega_{1,T}(n) = \frac{1}{\sqrt{2}}.$$

24. A method as in claim 23, wherein the step of producing a plurality of weighted information signals comprises multiplying the information signal by $\omega_{1,T}(n)$ and by $\omega_{2,T}(n)$.

25. A transmit circuit, comprising:

a feedback circuit coupled to receive at least one coefficient from a remote communication system, the feedback circuit producing an average of the at least one coefficient over a plurality of slots, wherein the at least one coefficient is phase rotated by 90 degrees in each successive slot;

a first multiplier circuit having a first input terminal coupled to receive an information signal and having a second input terminal coupled to receive the average of the at least one coefficient, the first multiplier circuit having an output terminal coupled to receive a first weighted information signal; and a first transmit antenna coupled to the first multiplier circuit output terminal.

26. A transmit circuit as in claim 25, comprising:

a channel encoder circuit having an input terminal coupled to receive said information signal and having an output terminal;

an interleaver circuit having an output terminal and having an input terminal coupled to the output terminal of the channel encoder circuit;

a symbol mapper circuit having an output terminal and having an input terminal coupled to the output terminal of interleaver circuit; and a modulator circuit having an output terminal coupled to the first input terminal of the first multiplier circuit and having an input terminal coupled to the output terminal of symbol mapper circuit.

27. A transmit circuit as in claim 25, comprising:

a second multiplier circuit having a first input terminal coupled to receive the information signal and having a second input terminal coupled to receive a normalized coefficient, the multiplier circuit having an output terminal coupled to receive a second weighted information signal; and a second transmit antenna coupled to the second multiplier circuit output terminal.

28. A transmit circuit as in claim 27, wherein the normalized coefficient is $$\omega_{1,T}(n) = \frac{1}{\sqrt{2}}.$$

29. A transmit circuit as in claim 25, wherein the at least one coefficient corresponds to a previously transmitted weighted information signal.

30. A transmit circuit as in claim 25, wherein the average of the at least one coefficient is $$\omega_{2,T}(n) = \frac{1}{2}(e^{j\phi_2(n)} + e^{j\phi_2(n-1)})$$

over time slots n−1.

31. A transmit circuit as in claim 30, wherein $\phi_2(n) \in \{0, \pi\}$, and wherein $\phi_2(n-1) \in \{\pi/2,-\pi/2\}$.

* * * * *